(12) United States Patent
Mueller

(10) Patent No.: US 11,683,724 B2
(45) Date of Patent: Jun. 20, 2023

(54) ADAPTIVE SPECTRUM AS A SERVICE

(71) Applicant: Dell Products L.P., Round Rock, TX (US)

(72) Inventor: Julius Mueller, Santa Cruz, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/396,051

(22) Filed: Aug. 6, 2021

(65) Prior Publication Data
US 2023/0044576 A1 Feb. 9, 2023

(51) Int. Cl.
*H04W 28/08* (2023.01)
*H04W 76/36* (2018.01)
*H04W 72/0453* (2023.01)
*H04W 72/23* (2023.01)

(52) U.S. Cl.
CPC ... *H04W 28/0942* (2020.05); *H04W 72/0453* (2013.01); *H04W 72/23* (2023.01); *H04W 76/36* (2018.02)

(58) Field of Classification Search
CPC ......... H04W 28/0942; H04W 72/0453; H04W 72/14; H04W 76/36
See application file for complete search history.

(56) References Cited

U.S. PATENT DOCUMENTS

| | | | |
|---|---|---|---|
| 9,924,516 B1 | 3/2018 | Naim et al. | |
| 10,575,321 B1 | 2/2020 | Wiatrowski et al. | |
| 11,153,762 B1 | 10/2021 | Routt | |
| 11,272,575 B1 | 3/2022 | Sevindik | |
| 11,356,499 B1 * | 6/2022 | Singh | H04L 69/18 |
| 11,589,250 B2 | 2/2023 | Sevindik et al. | |
| 2018/0288621 A1* | 10/2018 | Markwart | H04W 16/14 |
| 2019/0044614 A1* | 2/2019 | Khoshnevisan | H04W 72/082 |
| 2019/0058999 A1* | 2/2019 | Gunasekara | H04W 16/14 |
| 2019/0274052 A1 | 9/2019 | Zhao et al. | |
| 2020/0037175 A1 | 1/2020 | Sevindik et al. | |

(Continued)

OTHER PUBLICATIONS

Software Defined Radio Forum, Inc., "Spectrum Sharing Committee Release Plan," https://winnf.memberclicks.net/assets/CBRS/WINNF-SSC-0004.pdf, Slide 22, WINNF-SSC-0004.pdf, Jan. 13, 2021.

(Continued)

*Primary Examiner* — Yu-Wen Chang
(74) *Attorney, Agent, or Firm* — Amin, Turocy & Watson, LLP

(57) ABSTRACT

The described technology is generally directed towards adaptive spectrum as a service, in which spectrum can be dynamically allocated to adapt to demand for wireless capacity. The demand for wireless capacity can be based on monitoring system state, and/or proactively predicted based on other system state such as time of day. Reallocated spectrum can be monitored for performance, to converge spectrum allocation to a more optimal state. Allocated spectrum can be relocated, increased or decreased, including by the use of citizens band radio service spectrum or other spectrum. Currently allocated spectrum can be adapted into modified allocated spectrum by an application program (xApp) coupled to a radio access network intelligent controller (RIC), a citizens broadband radio service device, a domain proxy service, and/or a user device.

20 Claims, 21 Drawing Sheets

(56) References Cited

U.S. PATENT DOCUMENTS

| | | | |
|---|---|---|---|
| 2020/0106577 A1 | 4/2020 | Chen et al. | |
| 2020/0358712 A1 | 11/2020 | Kurian et al. | |
| 2021/0076378 A1* | 3/2021 | Pularikkal | H04W 72/085 |
| 2021/0127346 A1* | 4/2021 | Hmimy | H04W 72/14 |
| 2021/0185705 A1 | 6/2021 | Jones | |
| 2021/0219144 A1* | 7/2021 | Schwengler | H04W 48/14 |
| 2021/0235277 A1 | 7/2021 | Parekh et al. | |
| 2021/0258866 A1 | 8/2021 | Chou | |
| 2021/0329466 A1 | 10/2021 | Khasnabish et al. | |
| 2021/0352488 A1* | 11/2021 | Khawer | H04W 76/18 |
| 2021/0368349 A1* | 11/2021 | Bandyopadhyay | H04W 72/0453 |
| 2022/0007198 A1 | 1/2022 | Mahalingam et al. | |
| 2022/0007199 A1* | 1/2022 | Mahalingam | G06N 3/08 |
| 2022/0070731 A1* | 3/2022 | Henry | H04W 24/08 |
| 2022/0086846 A1 | 3/2022 | Sharma | |
| 2022/0141851 A1 | 5/2022 | Gross et al. | |
| 2022/0217704 A1 | 7/2022 | Lekutai | |
| 2022/0256551 A1 | 8/2022 | Atawia et al. | |
| 2022/0272701 A1* | 8/2022 | Hannan | H04W 16/02 |
| 2022/0303782 A1* | 9/2022 | Litjens | H04W 16/14 |
| 2022/0400385 A1 | 12/2022 | Eklund et al. | |

OTHER PUBLICATIONS

Software Defined Radio Forum, Inc., "Signaling Protocols and Procedures for Citizens Broadband Radio Service (CBRS): Spectrum Access System (SAS)—Citizens Broadband Radio Service Device (CBSD) Interface Technical Specification," https://winnf.memberclicks.net/assets/CBRS/WINNF-TS-0016.pdf, Document WINNF-TS-0016, Version V1.2.6 Nov. 25, 2020.

Software Defined Radio Forum, Inc., "Requirements for Commercial Operation in the U.S. 3550-3700 MHz Citizens Broadband Radio Service Band," https://winnf.memberclicks.net/assets/CBRS/WINNF-TS-0112.pdf, Document WINNF-TS-0112, Version V1.9.1 Mar. 11, 2020.

Sofi Ware Defined Radio Forum, Inc., "CBRS releases," https://cbrs.wirelessinnovation.org/enhancements-to-baselinespecifications, © Copyright 2021 downloaded from the internet Oct. 21, 2021.

O-RAN, "O-RAN Alliance," https://www.o-ran.org, downloaded from the internet Oct. 21, 2021.

Open RAN, "OpenRAN," https://telecominfraproject.com/openran/, downloaded from the internet Oct. 21, 2021.

FCC, "3.5 GHz Band Overview," https://www.fcc.gov/35-ghz-band-overview, Mar. 10, 2020.

Software Defined Radio Forum, Inc., "Enhancements to CBRS Baseline Standards (Release 2)," https://cbrs.wirelessinnovation.org/enhancements-to-baseline-specifications, © Copyright 2021 downloaded from the internet Oct. 21, 2021.

Non Final Office Action issued by the US Patent Office for U.S. Appl. No. 17/395,975 dated Aug. 25, 2022, 45 pgs.

Final Office Action received for U.S. Appl. No. 17/395,975 dated Jan. 24, 2023, 72 pages.

Non Final Office Action received for U.S. Appl. No. 17/395,934 dated Mar. 2, 2023, 36 pages.

Non Final Office Action received for U.S. Appl. No. 17/396,072 dated Dec. 15, 2022, 61 pages.

Final Office Action received for U.S. Appl. No. 17/396,072 dated Apr. 20, 2023, 56 pages.

\* cited by examiner

ADAPTIVE SPECTRUM AS A SERVICE

BACKGROUND

Spectrum used in wireless communications is a valuable and limited resource. Spectrum in the United States is managed by the Federal Communications Commission (FCC), which distinguishes between licensed, unlicensed and shared spectrum. The FCC controls and manages some portions of the spectrum as unlicensed spectrum to end customers such as private enterprises. Other portions of the spectrum are designated for unlicensed users, while other parts can be shared.

One example of shared spectrum is Citizens Broadband Radio Service (CBRS), which refers to the 150 megahertz (MHz) portion of the spectrum from 3550 MHz to 3700 MHz. A spectrum access system (SAS) manages CBRS spectrum sharing to avoid interference among incumbent access users (e.g., government and satellite users) who have the highest priority, priority access users (e.g., enterprises that have purchased a license) who have the next-highest priority, and general authorized access users who have the lowest priority.

Previously, private companies were required to get exclusive licensed spectrum from network operators, which is a manual process, takes much time and is not automated at all. As the use of wireless communications continue to grow globally, wireless spectrum allocation is a significant topic. The amount of available spectrum is relatively very small, and interference can be problematic.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
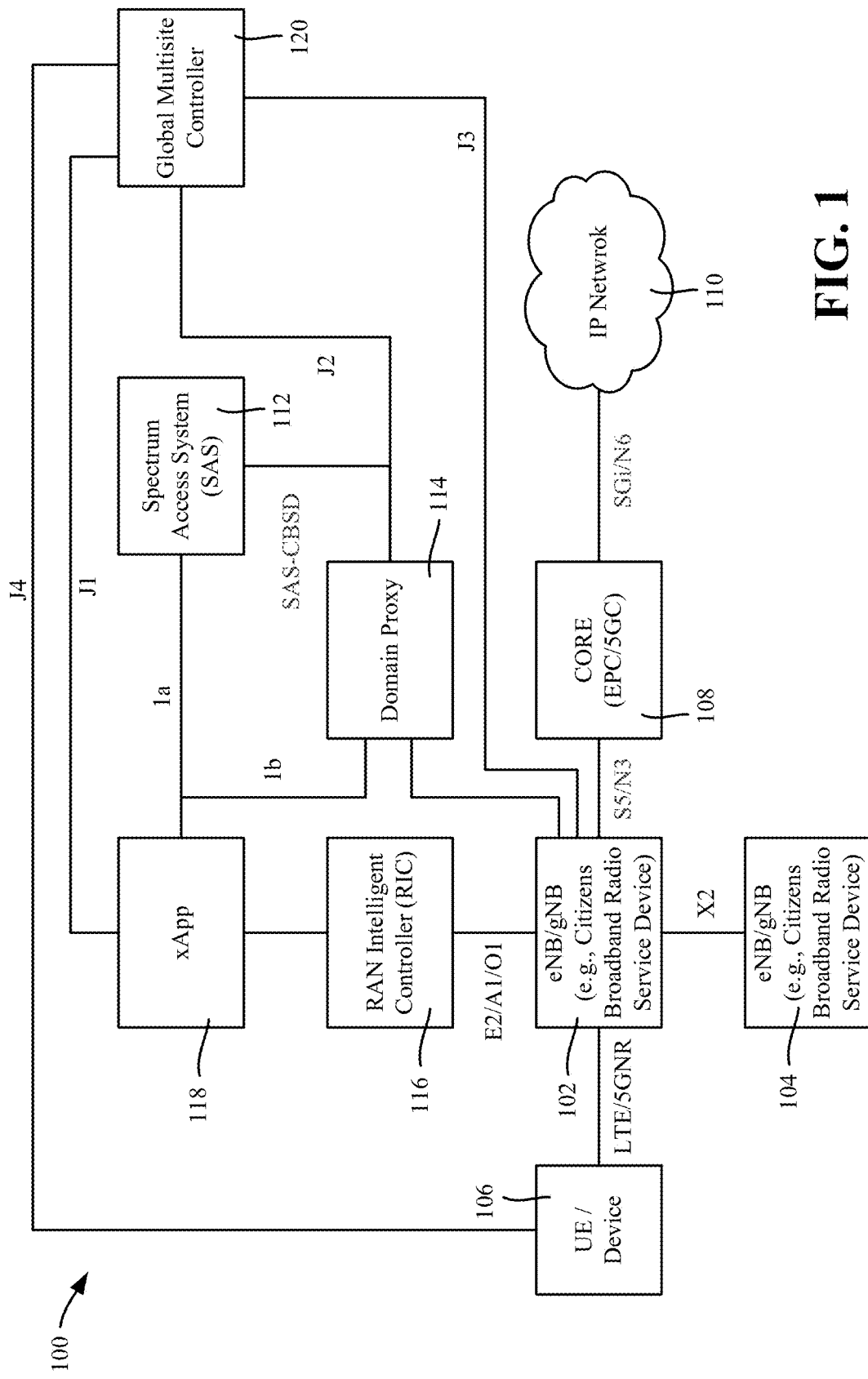
FIG. 1 is a block diagram representation of example components and interfaces of a communications network configured to adapt allocated, in accordance with various aspects and implementations of the subject disclosure.

Various aspects of the technology described herein are generally directed towards dynamically allocating spectrum to seamlessly adapt (e.g., scale up or down) wireless capacity based on user demand. The demand can be actual demand determined from various metrics, anticipated/expected demand predicted based on historical data and/or external information, or a combination of actual demand and anticipated/expected demand. Spectrum allocation can be performed within a coverage area and/or for a limited time, and can be deployed with a configuration that is relatively efficient for a usage scenario at that location and/or time. For example, the technology facilitates flexible adjustment of the uplink-to-downlink ratio in a coverage area.

By way of example, consider the citizens broadband radio service (CBRS). At times of high demand in which more wireless network wireless capacity is needed to service users, the technology described herein operates to request a grant of some portion of CBRS spectrum. When granted, the technology makes the granted portion of the CBRS spectrum available for scheduling uplink and downlink transmissions of user equipment. In another example, a hotspot can be relocated (e.g., a mobile hotspot can be moved, or a hotspot a one location can be deactivated and another activated at a different location) to adapt to current demand for wireless communications wireless capacity.

It should be understood that any of the examples herein are non-limiting. For instance, some of the examples are based on CBRS, however the technology described herein is applicable to cellular communication frequencies as well as Wi-Fi and other wireless technologies (Bluetooth®, satellite). Whereas the FCC regulates the CBRS spectrum through SASs, the concepts presented herein may be similarly applicable to operator-provided spectrum that can be brokered or managed as-a-Service, similarly to CBRS. As described herein, spectrum is treated as a resource that can be requested seamlessly, adaptively and on-demand as Spectrum-as-a-Service. Thus, any of the embodiments, aspects, concepts, structures, functionalities or examples described herein are non-limiting, and the technology may be used in various ways that provide benefits and advantages in communications and computing in general.

It also should be noted that terms used herein, such as "optimize," "optimization," "optimal" and the like only represent objectives to move towards a more optimal state, rather than necessarily obtaining ideal results. For example, "optimizing" a network/system/cell means moving towards a more optimal state, rather than necessarily achieving an optimal result. Similarly, "maximize", such as to "maximize throughput" means moving towards a maximal state, not necessarily achieving such a state.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows example system architecture 100 of various elements and interfaces, including elements involved in spectrum management. Note that the example system architecture 100 of FIG. 1 is capable of using CBRS spectrum via citizens broadband radio service devices (CBSDs) 102 and 104, however it is understood that this is a non-limiting example. Dynamic spectrum allocation technology as described herein can be implemented based on any available spectrum.

In the example of FIG. 1, a user equipment (UE) device 106 connects to other elements of the system 100 via the eNodeB (eNB) or gNodeB (gNB), which as exemplified in FIG. 1 are incorporated into a device 102 that supports citizens broadband radio service, as a CBSD. Communications can be based on conventional fourth generation long term evolution (LTE) technology and new radio (NR) technology such as fifth generation (5G) and beyond. The exemplified UE device 106 is configured to communicate over the CBRS spectrum, if the device 102 schedules the device 106 to do so, or can be scheduled to use LTE and/or new radio cellular frequencies. Note that in an implementation in which CBRS spectrum is dynamically allocated in a coverage area, as long as one or more user devices can operate in the CBRS spectrum, benefits of dynamic allocation via CBRS such as increased wireless capacity can be realized in that coverage area regardless if other active user devices in the area do not support CBRS communications.

Once connected to the system, the user device 106 communicates via the network device 102, that is, the eNodeB (eNB) for LTE or gNodeB (gNB) for standalone new radio, or eNB and gNB both for non-standalone new radio and/or in a dual connectivity mode. The eNB and/or gNB are coupled (e.g., via an S5 or N3 interface, respectively) to a core network 108 (the evolved packet core (EPC) network 108 or 5G core network, respectively). In turn, the core network 108 is coupled (via a packet gateway and the sGI interface for EPC or user plane function and the N6 interface for 5GC) to an external Internet protocol (IP) domain, exemplified in FIG. 1 as IP network 110.

In general, to operate in the CBRS spectrum, the eNB/gNB 102 couples to a spectrum access system 112 through a domain proxy 114 via a SAS-CBSD interface. The domain proxy 114 facilitates the coupling of multiple eNBs/gNBs to couple to the spectrum access system 112, rather than have a group of individual eNBs/gNBs more directly communicate with the spectrum access system 112.

The spectrum access system (SAS) 112 via the domain proxy 114 and application programming interface (API) set allows a CBSD (e.g., device 102) to register to receive a unique identifier from the SAS 112. Once registered, the CBSD can deregister from the SAS, such as if the CBSD is decommissioned or moved.

When registered, the CBSD can inquire (via a CBSD basic spectrum inquiry) to determine what spectrum is available given the CBSD's location and installation characteristics. Assuming some spectrum is available, the SAS 112 grants requests when a CBSD requests a grant of a portion of the CBRS spectrum for use.

Note that once the reservation has been made and a grant request is approved, the CBSD is not yet authorized to transmit using the grant. Instead, the CBSD periodically sends a heartbeat request for each approved grant, which, if transmission is allowed, returns authorization to transmit. The CBSD relinquishes a grant when no longer needed for use.

In FIG. 1, a radio access network (RAN) intelligent controller (RIC 116), in conjunction with an application program (referred to as an xApp 118) provides for one way in which dynamic spectrum allocation is adaptable for a wireless communication usage scenario. When configured, the xApp 118 can communicate with the SAS 112 (e.g., via an interface 1a) and the domain proxy 114 (e.g., via an interface 1a). The device 102 communicates with the RIC 114 via O-RAN (Open RAN) interfaces, including the E2/A1/O1 interfaces. Other ways described herein include extending a CBSD's capabilities, extending a domain proxy's capabilities, and/or extending a UE device's capabilities.

As shown in FIG. 1, via various interfaces J1-J4, a global multisite controller 120 can communicate with the UE device 106, xApp 118, domain proxy 114, and eNB/gNB device 102. Among its functions, the global multisite controller 120 can return metadata related to dynamic spectrum allocation, including thresholds (e.g., that when met trigger dynamic spectrum allocation and reallocation), incremental claim steps (how much at a time that claimed dynamic spectrum allocation is to increase or decrease) and an observation time window (e.g., the last x seconds, minutes, hours, days, weeks or month(s) of monitored data for the purpose of evaluating the thresholds). The global multisite controller 120 can perform inventory updates, telemetry setup, analyze adjacent cells and their configurations, and prepare an initial configuration. The global multisite controller 120 also can perform analytics (e.g., via machine learning (ML), artificial intelligence (AI) and/or rules), can develop a spectrum adjustment plan, and verify the spectrum adjustment plan verification through the SAS 112.

Figure 2:
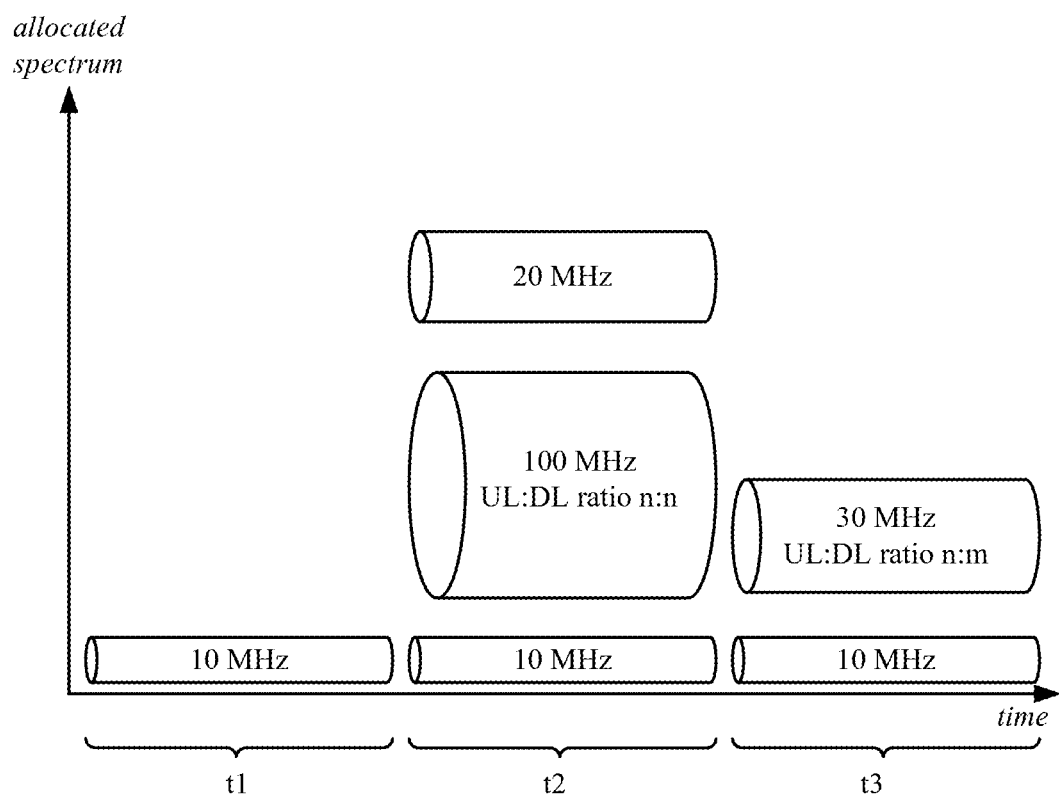
FIG. 2 is an example block diagram representation of allocating and reallocating spectrum over time, including changing a downlink to uplink ratio, in accordance with various aspects and implementations of the subject disclosure.

FIG. 2 shows a general conceptual example of dynamically allocating spectrum. In a first time period, 10 MHz of spectrum is available for scheduling wireless network communications to and from (downlink and uplink) UE devices in a served coverage area. At time period t2, increased demand for wireless capacity is detected (or predicted), resulting in dynamic allocation of additional spectrum to adapt to the increased demand, which in the example of FIG. 2 is an additional 100 MHz plus 20 MHz. For example, in a CBRS environment (where at most 150 MHz can be granted), additional spectrum can be requested from a spectrum access system (SAS), and if granted and transmission is allowed (e.g., for the time period t2), the additional spectrum can be allocated for use in scheduling downlink and uplink communications. In other scenarios, additional spectrum can be leased or moved from one location to another within the coverage area and/or moved from an adjacent coverage area (which would otherwise be unavailable because of interference with the adjacent coverage area).

In a third time period t3, less wireless capacity is needed, and thus the amount of useable spectrum is reduced. This can be by moving a portion of the total spectrum to another location, or by relinquishing at least some CBRS spectrum or other spectrum. Note that the time periods t1-t3 are shown in FIG. 2 as generally the same in length, however this is a non-limiting example, and equal as well as unequal time periods may be present in a given usage scenario.

FIG. 2 also illustrates how the uplink-to-downlink (UL:DL) ratio can be configured for at least some of the spectrum. Note that the CBRS is a time-division-duplex band and thus adjusting the UL:DL ratio is straightforward via different frame structure configurations. During time period t2, the uplink-to-downlink (UL:DL) ratio is n:n (e.g. 4:4) within the additional 100 MHz range. During time period t3, the uplink-to-downlink (UL:DL) ratio is n:m (e.g. 2:6) within the additional 30 MHz range (as reduced from the previous time period t2's 100 MHz range).

Dynamic spectrum allocation can thus be used in any coverage area/timeframe to adapt to demand for wireless capacity, as well as deployed with a configuration that is efficient for the usage scenario given a certain time. Some non-limiting example use cases that can benefit through dynamic spectrum allocation as described herein include a shopping mall, in which additional spectrum can be made available near a food court during lunch hours, as opposed to other shopping hours in which the spectrum can be more equally distributed throughout the mall. Another example can be a large distributed-location factory, with changing wireless activities across the factory facilities depending on the time and location of ongoing work. Equal and static wireless capacity distribution is unlikely, and thus the locations/facilities can be provisioned with spectrum as needed. In another example, consider an in-house distributed antenna system that is deployed for use in office space on the ground floor(s) and housing above, where more spectrum may be needed in the office during working hours, and more spectrum needed in the housing area at other times. An airport (or other similar facility such as a commuter train station) can balance spectrum across terminals depending on schedules, e.g., passenger amounts due to departing or arriving flights at the airport can be known in advance to provision and re-provision spectrum as needed. Thus, actual demand, predicted demand and/or external data such as commuting schedules can be used to dynamically adapt spectrum allocation to a usage scenario.

Moreover, the uplink-to-downlink ratio can be configured as shown in FIG. 2. As another non-limiting example, a concert venue, press conference, speech or the like provides a usage scenario in which attendees tend to upload live or nearly live videos to social media or the like, and thus scheduling for more uplink communications than downlink communications may be appropriate during such an event. In contrast, a televised sporting event may have many event attendees downloading a live-streamed video of the event, such as to see replays, zoomed-in camera views, different camera angles and so forth, whereby scheduling to facilitate more downlink communications than uplink communications may be appropriate during the event.

Figure 3:
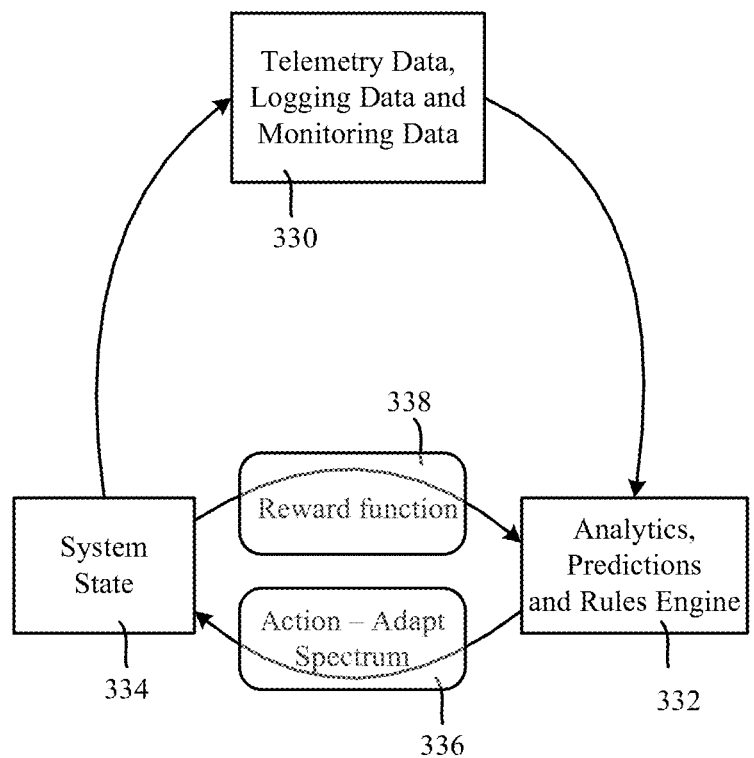
FIG. 3 is an example block diagram representation of telemetry data gathering, analytics of telemetry data and actions to adapt spectrum, in accordance with various aspects and implementations of the subject disclosure.

FIG. 3 shows a conceptual example of adapting spectrum to modify the system state, such as for a coverage area (which can be an area within a single cell, multiple cells, or an entire network). Telemetry data, logging data and monitoring data 330 are obtained and fed into an analytics, predictions and rules engine 332 or the like. Telemetry data can be gathered throughout the end-to-end system including connection type, subscriber information, location, context, connection importance and cost per bit. These and other factors can be considered as input parameters for an adaptation algorithm. Based on the various data 330, the analytics, predictions and rules engine 332 can change the current system state 334, e.g., by an action 336 (or multiple actions) that increases or decreases allocated spectrum and/or changes the uplink-to-downlink ratio. Note that the system state can include time of day, day of week, a planned event, a schedule (e.g., commuter or passenger schedules) and so forth, such that spectrum can be proactively adapted, instead of or in addition to reactive adaptation of spectrum based on measured conditions and the like. The changed state is input into a reward function 338, which in conjunction with updated (following the changed state) telemetry data, logging data and/or monitoring data 330, is processed by the (real-time and non-real-time) analytics, predictions and rules engine 332 to move the overall system to a more optimal state.

In this way, a system can thus converge towards a generally optimal system state over time. Note however that even when converged such a state is not necessarily static, and various factors such as time-of-day, the start or end of a largely attended event and so on can revise the system state in a relatively fast (coarse) manner as opposed to a gradual fine-tuned convergence.

Returning to FIG. 1, as set forth herein, the metadata from the global multisite controller 120 can include incremental and other change data corresponding to changing currently claimed spectrum data, threshold data or an observation time window. The incremental data can include a first step size, indicating an amount of allocated spectrum to increase in a spectrum addition operation, and a second step size, indicating an amount of allocated spectrum to decrease in a spectrum reduction operation. The step size to increase or decrease can be the same. For example, the incremental data can specify adding to/removing useable spectrum from a sector or cell step sizes per increment, such as 5 MHz, 10 MHz, 20 MHz, 40 MHz, and so forth. Other change metadata can specify that the system enable/disable one or more radio technologies (e.g., 4G, 5G, 6G, Wi-Fi 802.11n, 802.11ac, 802.11ax, etc.). It is feasible to for the metadata to indicate a different rate of change, such as via different observation time windows depending on whether the previous spectrum adaptation was to increase or reduce the allocated spectrum.

The threshold data can include values representing a maximum wireless capacity for a channel (where a channel can be any portion of allocated spectrum as defined by the system), a peak wireless capacity for the channel, available wireless capacity data, current wireless capacity used data, a maximum number of supported active users in a cell, a maximum number of supported active users in a radio access network, a maximum number of supported active users in a core, a current number of active users in the cell, a current number of active users in the radio access network, and/or a current number of active users in the core. Further threshold data can include a current number of idle users in the cell, a current number of idle users in the radio access network, a current number of idle users in the core, estimated available wireless capacity for additional users in the cell, estimated available wireless capacity for additional users in the radio access network, and/or estimated available wireless capacity for additional users in the core. The thresholds can correspond to traffic heuristics based on time, traffic heuristics for the cell, traffic heuristics for a location in the cell, and/or traffic heuristics based on an event. Any of the threshold values can be monitored against actual current condition(s), and if a threshold value is violated, an action corresponding to an incremental step or other change can be taken to adapt the allocated spectrum to the condition(s).

After at least one incremental step/change that adapts the currently allocated spectrum into the allocated spectrum, various performance data can be monitored to evaluate the result (successfully improved the performance or performance worsened) of the change. Such performance data (e.g., for before and after comparison and/or comparison versus threshold data) can include dropped call data, dropped session data, active user data, idle user data, throughput data per device, cell throughput data, radio access network throughput data, core-network gateway throughput data, interference data that measures interference between cells, and/or interference data that measures interference between sectors As set forth herein, one way to implement the spectrum adapting technology as described herein is to leverage an xApp and RAN Intelligent Controller (RIC). Such an implementation facilitates adaptive dynamic spectrum allocation over multiple eNB s/gNB s, which may include an area, a region, or any group of cells up to a complete cellular carrier's network.

Figure 4:
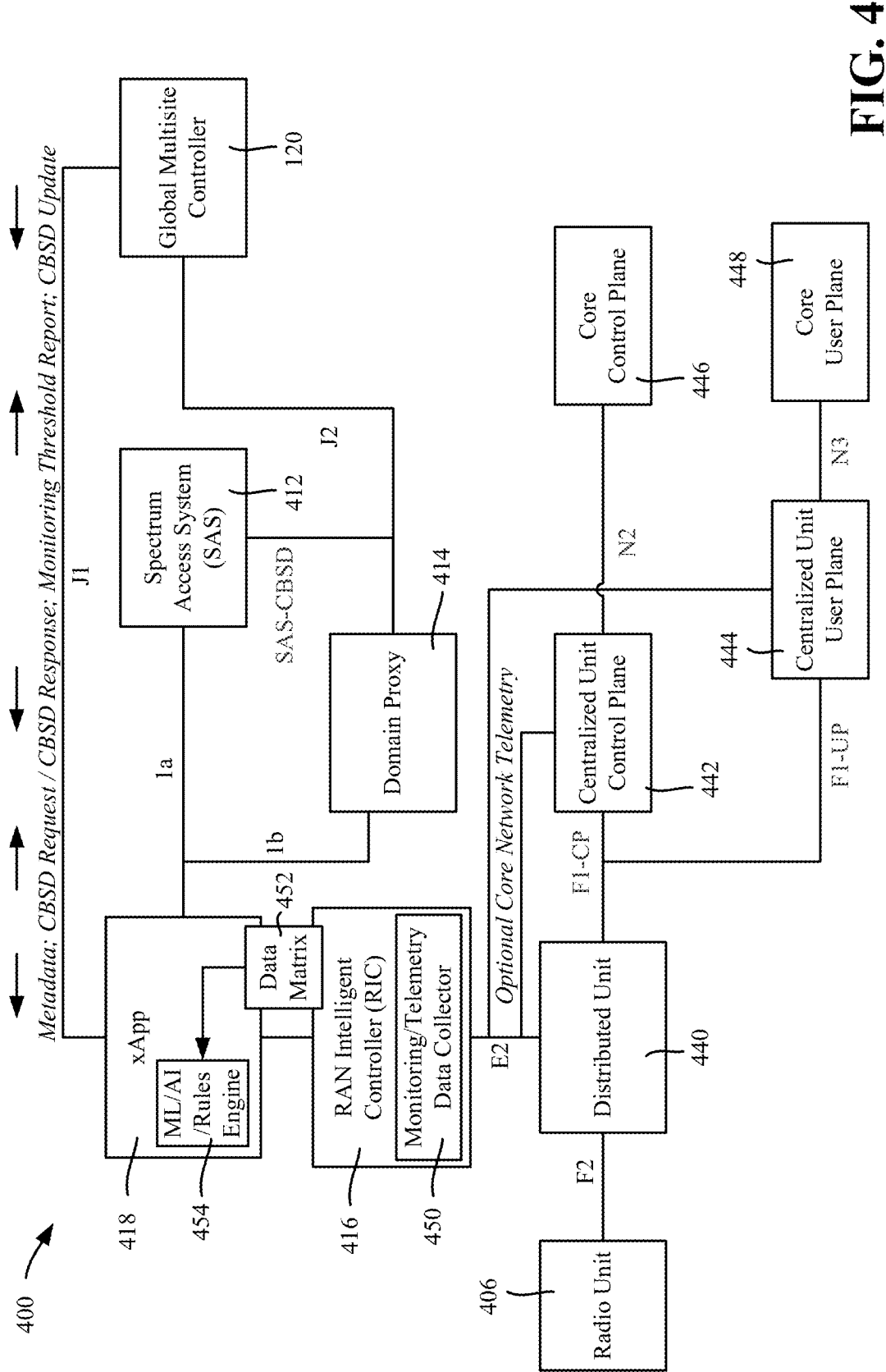
FIG. 4 is a block diagram representation of example components including a radio access network intelligent controller (RIC) and an application program (xApp) integrated into a wireless communications network to facilitate adapting spectrum based on various information, in accordance with various aspects and implementations of the subject disclosure.

As shown in the example system 400 of FIG. 4, which is based on Open RAN, or O-RAN, a radio unit (e.g., new radio, 5G or beyond) is coupled (F2 interface) to a (virtualized) distributed unit 440 (a logical node of the gNB), which in turn couples to a centralized unit, divided into a centralized unit control plane 442 (a logical node of the gNB) and a centralized unit user plane 442 (a logical node of the gNB). The centralized units 442 and 444 couple to the core, with the centralized unit control plane 442 coupling to a core control plane 446 via an N2 interface, and the centralized unit user plane 444 coupling to a core user plane 446 via an N3 interface.

As further shown in FIG. 4, a RIC 416 has integrated monitoring/telemetry capabilities (represented in FIG. 4 as monitoring/telemetry data collector 450), and as is known, gathers system utilization data via O-RAN-defined E2/A1/O1 interfaces. For example, the RIC can obtain optional core network telemetry from the core/other components via the E2 interface.

As is known, a RIC is divided into a non-real time logical function (e.g., in service management and orchestration) and a near-real time logical function that couples to xApps, including the xApp 418 as described herein. In general, functions hosted by xApps allow services to be executed at the near-real time RIC 416, with actions sent to the gNB distributed unit and centralized unit nodes via the E2 interface. The combination of data (e.g., monitoring data, performance data and so forth) obtained from the non-real time logical function (via the A1 interface) and any (optional) core network telemetry and/or other (e.g., per gNB) data obtained via the E2 interface are used to dynamically adapt allocated spectrum. This data is made accessible to the xApp 418 in a suitable data structure, shown in FIG. 4 as a data matrix 452, comprising data relevant to adapting allocated spectrum as described herein.

In general, the xApp 418 requests and obtains metadata from a global multisite controller 120 including the threshold data, the incremental spectrum claim change step data, and the observation time window. Based on the metadata and the data matrix 452, the xApp 418 processes the data matrix 452 (or other suitable data structure) of the data collected by the RIC 416 into the actions that adapt allocated spectrum. A machine learning (ML)/artificial intelligence (AI) and/or rules engine 454 performs the data processing, including any analytics, threshold evaluation, rule application and/or the like to make spectrum allocation decisions. By way of a straightforward example, if the number of active users in a coverage area exceeds a threshold value corresponding to an amount of currently allocated spectrum, additional spectrum is allocated via an action decided by the engine 454. As with other implementations, the xApp 418 can proactively predict a need for additional (or reduced) spectrum in one or more of its cells, for example based on historical mobility pattern data.

Figure 5:
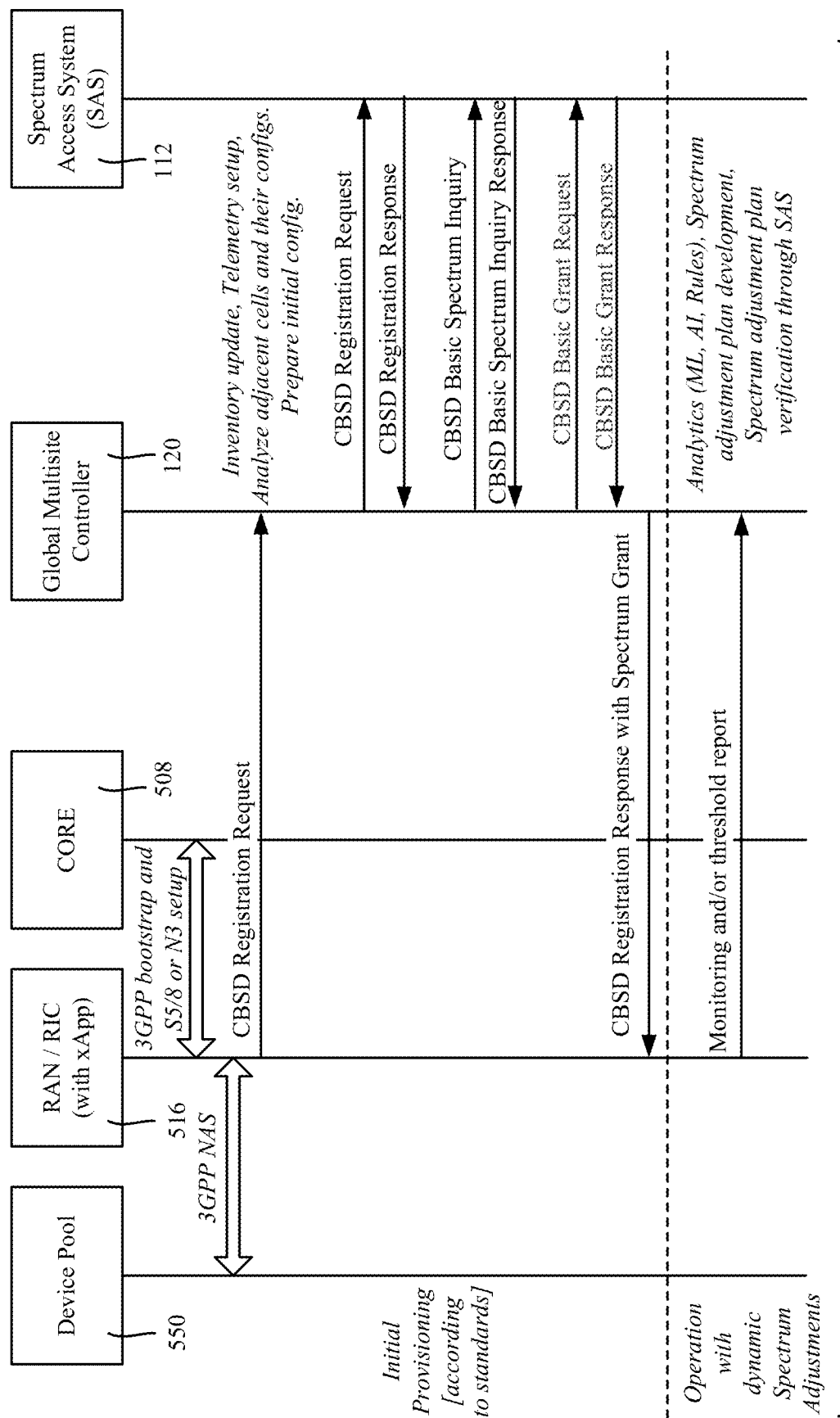
FIGS. 5 and 6 comprise a dataflow and timing representation showing example communications between components (e.g., of FIG. 4) to allocate citizens band radio service (CBRS) spectrum on demand, in accordance with various aspects and implementations of the subject disclosure.
Figure 6:
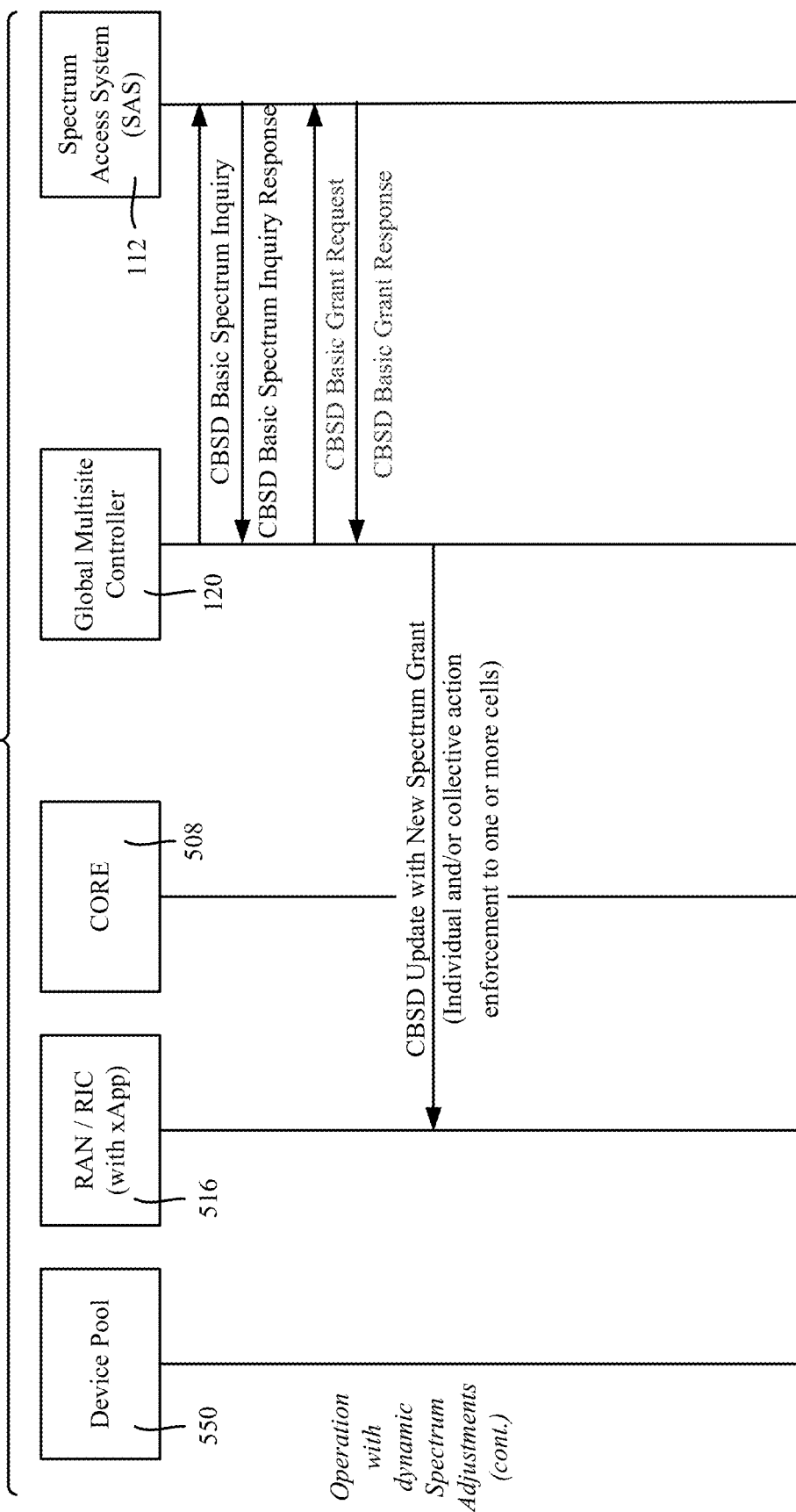

FIGS. 5 and 6 comprise a dataflow/timing diagram of communications between various components corresponding to those of FIG. 4, in an example CBRS implementation in which currently allocated spectrum is to be adapted into modified allocated spectrum via the addition of CBRS spectrum. FIGS. 5 and 6 represent a state in which the need for the additional spectrum has already been determined. The RAN/RIC including the xApp (block 516) communicates with the core network components (block 508) as described herein, e.g., according to specifications of the 3rd Generation Partnership Project (3GPP). The RAN/RIC 516 also communicates with (e.g., a pool) of user devices 550 according to the 3GPP Non-Access-Stratum (NAS) protocol.

To obtain the additional CBRS spectrum, the RAN/RIC 516 sends a CBSD registration request to the global multisite controller 120, providing the needed (standard-specified) information, e.g., including owner data, credentials, location data, and transmission characteristics. As is understood, this information and request is per each CBSD eNB/gNB device of the RAN in each location for which additional spectrum is to be allocated. Based on the request, the global multisite controller 120 updates its inventory (e.g., comprising identities of base stations and associated cells and statuses, which cells are in a particular area/region, where they are located, which are collocated, cell bandwidth, cell frequency, and the like), and sets up telemetry. The global multisite controller 120 analyzes adjacent cells and their configurations to prepare an (e.g., initial) configuration corresponding to the request.

The global multisite controller 120 (which in this example communicates directly with the spectrum access service (SAS) 112 via a SAS-CBSD interface rather than through a domain proxy) forwards the CBSD registration request to the spectrum access system 112, and receives a registration response. In this example, the corresponding CBSD coupled to the RAN/RIC 516 is thus appropriately registered. Note that the SAS evaluates requests and rejects incorrect/inappropriate requests; for purposes of brevity and explanation, in the examples herein the CBSD requests are not rejected, and at least some CBRS spectrum is available.

As set forth herein, to obtain a grant of CBRS spectrum, a CBSD spectrum inquiry is made to the SAS 112 to determine which frequencies are available for the CBSD to use. The SAS responds with the frequencies; (note that the term "channel" can be used to describe a 10 MHz segment of the CBRS spectrum).

Once the available spectrum is returned to the global multisite controller 120, the global multisite controller 120 selects one or more of the frequencies based on the amount requested, e.g., corresponding to the incremental spectrum claim step. The global multisite controller 120 can request more than a single increment on behalf of the CBSD with the understanding that the CBSD will increase (or decrease) according to the corresponding step size and instruct the global multisite controller 120 to release any additional CBRS spectrum that is not needed, e.g., once the increment(s) converge to a more optimal state.

A CBSD grant request is then performed by the global multisite controller 120, and in this example, the response from the SAS 112 grants the requested CBRS spectrum. The global multisite controller 120 returns a registration response along with the spectrum grant to the RAN/RIC 516. The RAN/RIC 516 can then use the grant as appropriate, e.g., provide it to an eNB/gNB for use in transmission, according to the heartbeat requests that obtain authorization to transmit.

Once operational with the dynamic spectrum adjustments, the communications (below the dashed line) in FIG. 5 and in FIG. 6 can occur. For example, the RAN/RIC 516 can obtain new state data for the xApp to modify the spectrum allocation. The RAN/RIC 516 (e.g., via the xApp) can send a monitoring and/or threshold report to the global multisite controller 120, which based thereon can perform analytics (ML, AI, Rules) to develop a spectrum adjustment plan, and obtain verification through SAS with respect to the spectrum adjustment plan.

In the example of FIG. 6, to adjust the allocated CBRS spectrum, which can be a further increase or a decrease, the global multisite controller 120 makes a new CBSD spectrum inquiry request to obtain a CBSD spectrum response, and based on the response, request a new spectrum grant. When received, the new spectrum grant is returned to the RAN/RIC 516 as a CBSD update with the new spectrum grant (for individual and/or collective action enforcement to one or more cells). As is understood, further updated monitoring and/or threshold reports can be sent to the global multisite controller 120, with the operations and communications repeated to obtain further updated spectrum grants, and so on. Also, although not explicitly shown, it is understood that the CBRS spectrum grant can be relinquished by the RAN/RIC/xApp 516 via the global multisite controller 120.

Figure 7:
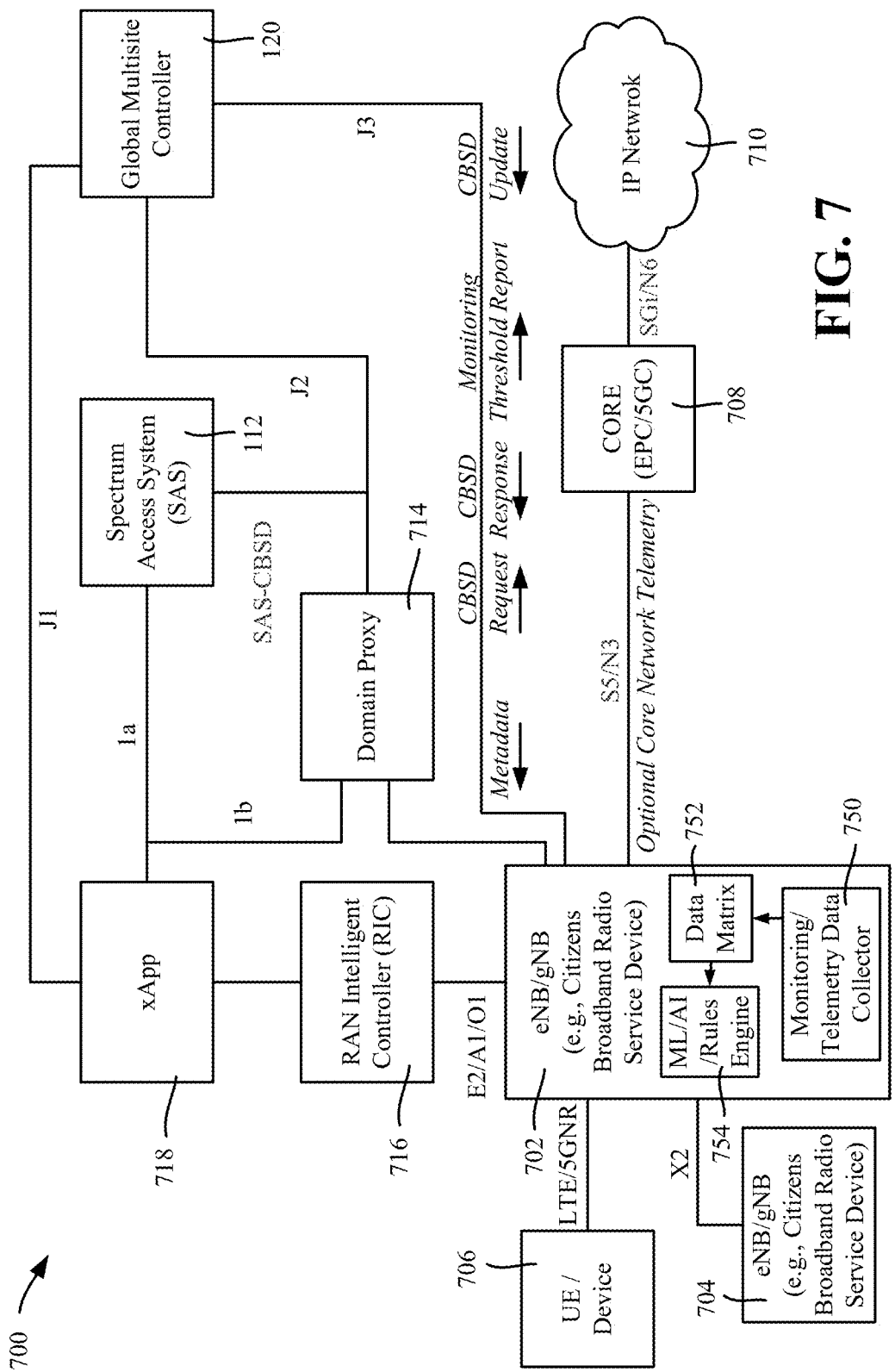
FIG. 7 is a block diagram representation of example components including an eNodeB/gNodeB (eNB/gNB) configured to adapt spectrum based on various information, in accordance with various aspects and implementations of the subject disclosure.
Figure 8:
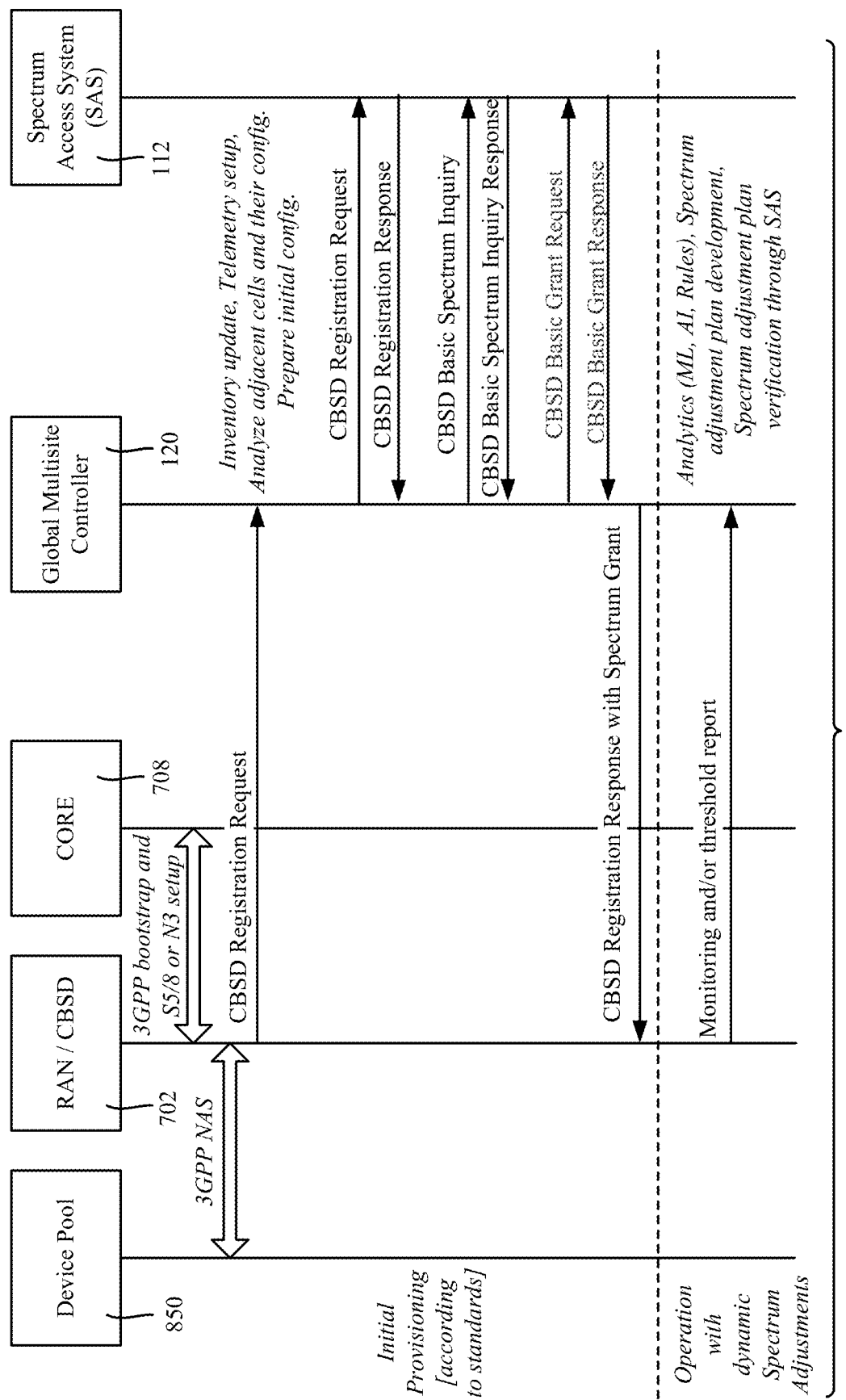
FIGS. 8 and 9 comprise a dataflow and timing representation showing example communications between components (e.g., of FIG. 7) to allocate citizens band radio service (CBRS) spectrum on demand, in accordance with various aspects and implementations of the subject disclosure.
Figure 9:
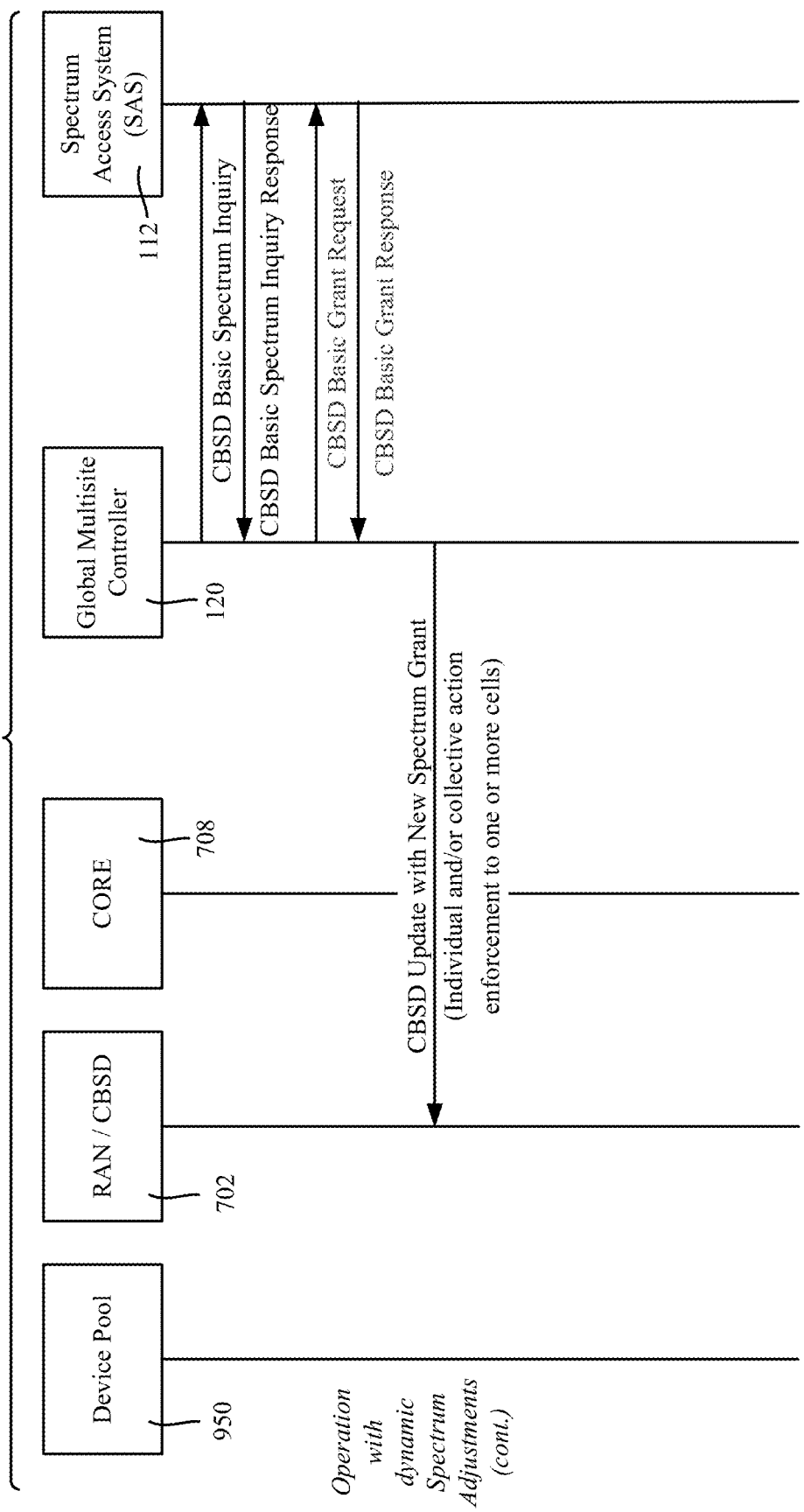

Another alternative implementation is shown in FIGS. 7-9, in which an eNB/gNB CBSD 702 performs the dynamic spectrum allocation adaption, (instead of or in addition to an xApp/RIC providing the functionality for any number of eNB/gNB s in the network). This single cell deployment facilitates local optimization. Notwithstanding, collaborative deployment for synchronization between one or more other cells/cell group(s) can provide for more global optimization, e.g., with collaborative deployment with eNB/gNB CBSD 704 in FIG. 7 can be accomplished with a suitable extension to the X2 interface. This facilitates inter-cell coordination through X2 interfaces (and/or possibly via the domain proxy as described with reference to FIGS. 10-12) to coordinate spectrum claims collaboratively allowing global optima.

In this alternative implementation in general, the CBSD (eNB/gNB) 702 includes (internal) monitoring/telemetry capabilities to measure throughput, utilization, bearers, network slices, number of active subscribers per cell, and so forth, as arranged in a data matrix 752 or other suitable data structure. Core network telemetry can be obtained from the core via the S5 and/or N3 interfaces as additional input. As shown in FIG. 7, in this example implementation the CBSD 702 requests the metadata from the global multisite controller 120. This metadata can be specific to the cell or cells/cell group(s).

An ML/AI/rules engine 754 monitors the data representing the actual state versus the metadata-specified thresholds for violations according to the metadata's observation time window, that is, to analyze the state for upper or lower threshold violations. In case of detecting one or more violations, the engine 754 uses the metadata-specified incremental spectrum claim steps to reduce or increase the allocated spectrum claim as described herein, and if appropriate enable/disable a radio technology or technologies. As with other implementations, the eNB/gNB 702 can proactively predict a need for additional (or reduced) spectrum, for example based on historical mobility pattern data.

FIGS. 8 and 9 comprise a dataflow/timing diagram of communications between various components corresponding to those of FIG. 7, in an example CBRS implementation in which currently allocated spectrum is to be adapted into modified allocated spectrum via the addition of CBRS spectrum. The communications are generally the same as in FIGS. 5 and 6 and thus are not described again for purposes of brevity, except to note that the RAN's CBSD 702 (e.g., instead of or in addition to the xApp and RIC as in FIGS. 5 and 6) operate to dynamically allocate spectrum as described with reference to FIG. 7. Also, although not explicitly shown, it is understood that the CBRS spectrum grant can be relinquished by the CBSD 702 via the global multisite controller 120.

Figure 10:
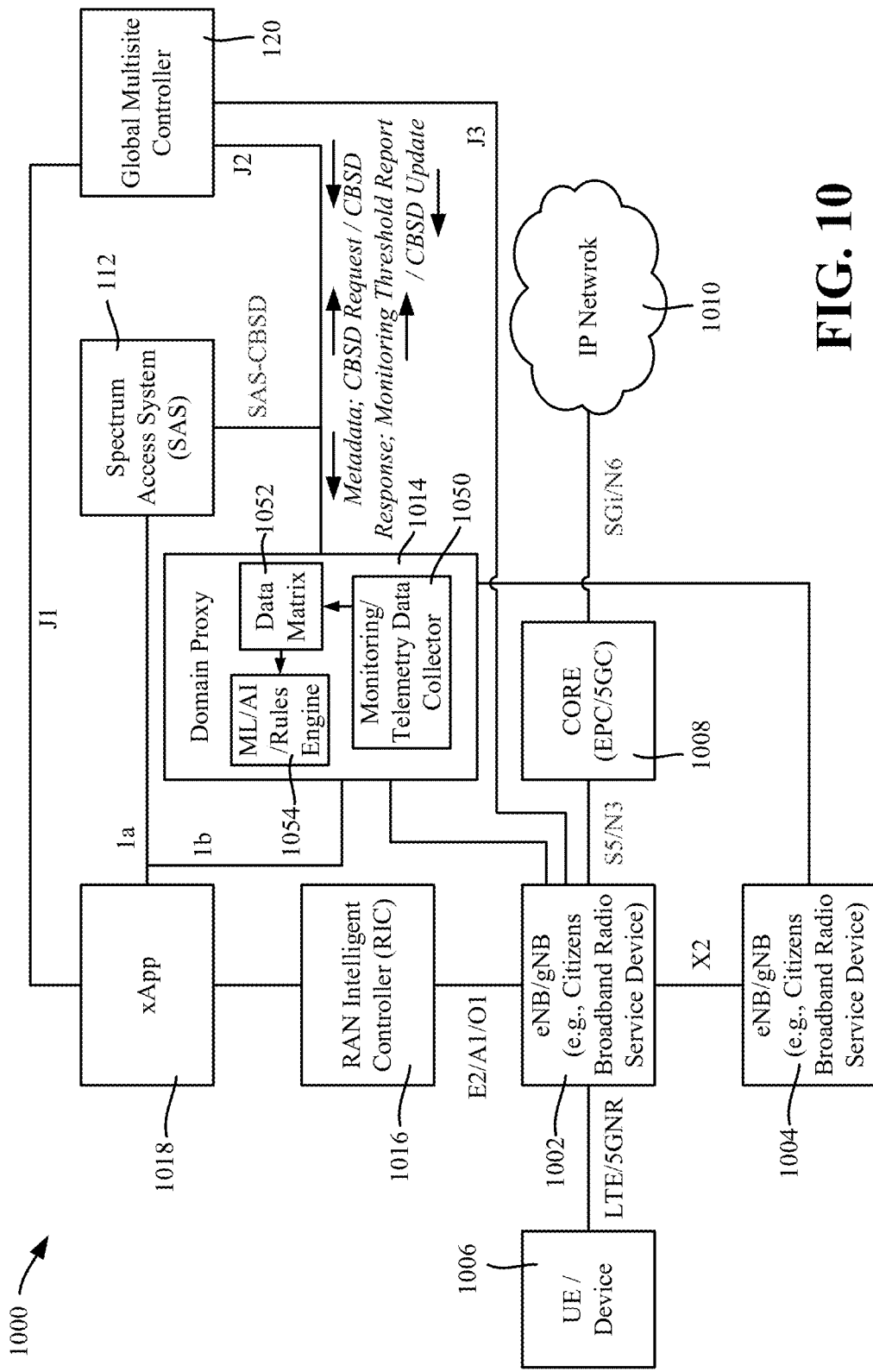
FIG. 10 is a block diagram representation of example components including a domain proxy configured to adapt spectrum based on various information, in accordance with various aspects and implementations of the subject disclosure.
Figure 11:
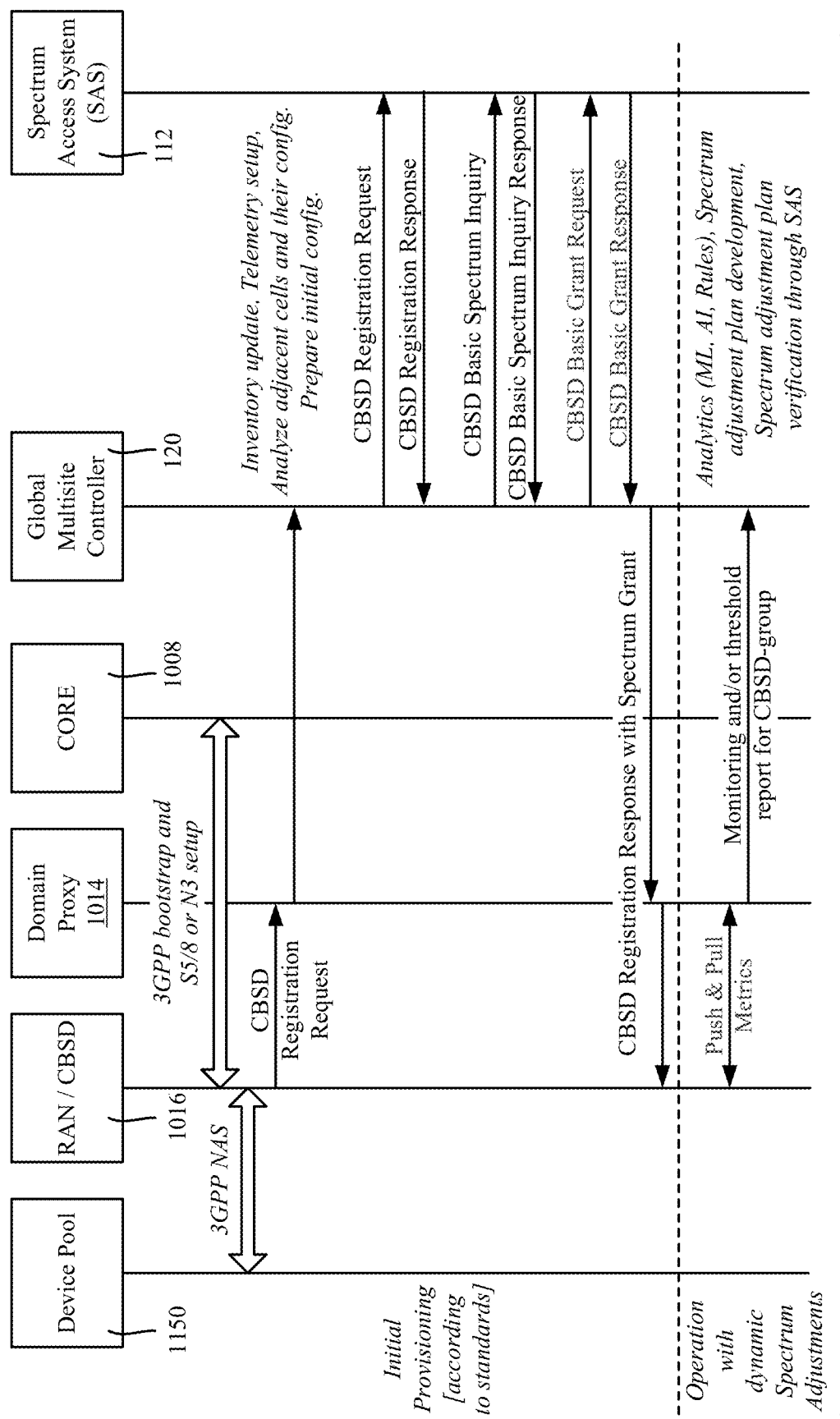
FIGS. 11 and 12 comprise a dataflow and timing representation showing example communications between components (e.g., of FIG. 10) to allocate citizens band radio service (CBRS) spectrum on demand, in accordance with various aspects and implementations of the subject disclosure.
Figure 12:
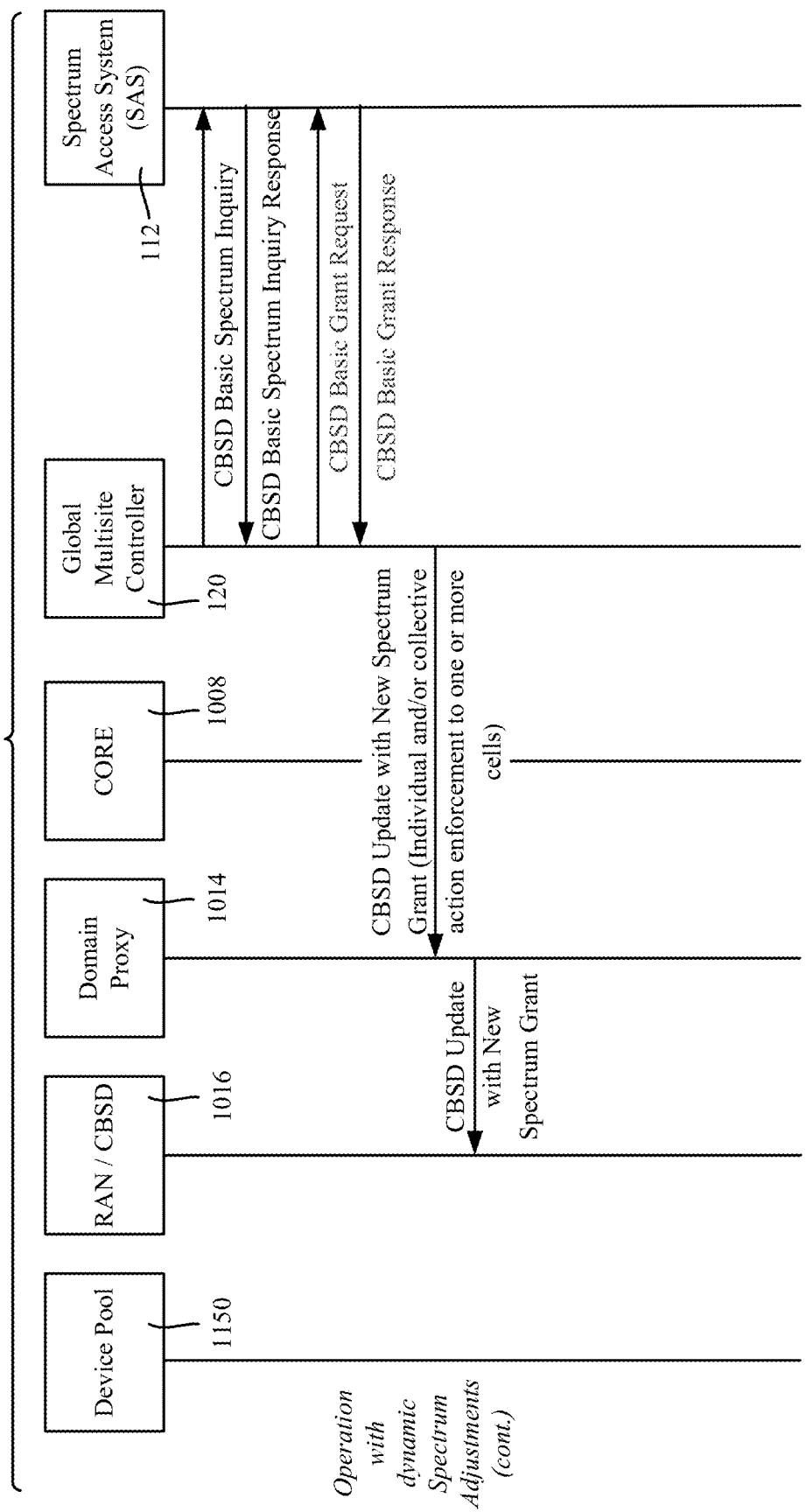

FIGS. 10-12 show another implementation, in which a domain proxy 1014, which couples an eNB/gNB (e.g., CBSD) 1002 (and in this example an eNB/gNB (e.g., CBSD) 1004) to the spectrum access system 112 and the global multisite controller 120, performs the dynamic spectrum allocation adaption. This deployment facilitates optimization of a cell group that is coupled to the domain proxy 1014, such as in enterprise use cases in which more global orchestration capability that oversees a subnetwork of eNBs/gNBs is desired. For example, a retail store, a campus, a large factory and so on may have such a group of eNB/gNBs. It is understood, however, that having a domain proxy perform dynamic spectrum allocation adaption does not preclude an eNB/gNB participate in dynamic spectrum allocation adaption to an extent, such as to optimize (or recommend to the domain proxy that it desires optimization). Similarly, a RIC/xApp can participate in dynamic spectrum allocation as well, including to limit how much CBSD spectrum the domain proxy 1014 is allowed to use, so as, for example, to try and reserve some CBSD spectrum for a nearby domain proxy (not shown) that oversees another cell group.

In this alternative implementation in general, the domain proxy 1014 includes monitoring/telemetry capabilities to measure throughput, utilization, bearers, network slices, number of active subscribers per cell, and so forth, as arranged in a data matrix 1052 or other suitable data structure. Other telemetry/monitoring data can be obtained from its connected eNBs/gNBs and/or the RIC/xApp 1016/1018 as additional input. As shown in FIG. 10, in this example implementation the domain proxy 1014 requests the metadata from the global multisite controller 120.

In this example, based on the metadata an ML/AI/rules engine 1054 incorporated into (or otherwise coupled to) the domain proxy 1014 monitors the data representing the actual state versus the metadata-specified thresholds for violations according to the metadata's observation time window, that is, to analyze the state for upper or lower threshold violations. In case of detecting one or more violations, the engine 1054 uses the metadata-specified incremental spectrum claim steps to reduce or increase the allocated spectrum claim as described herein, and if appropriate enable/disable a radio technology or technologies. As with other implementations, in addition to monitoring, the domain proxy 1014 can proactively predict a need for additional (or reduced) spectrum, for example based on historical mobility patterns, and thus obtain additional spectrum for use (or reduce allocated spectrum) even without a violation.

FIGS. 11 and 12 comprise a dataflow/timing diagram of communications between various components corresponding to those of FIG. 10, in an example CBRS implementation in which currently allocated spectrum is to be adapted into modified allocated spectrum via the addition of CBRS spectrum. FIGS. 11 and 12 represent a state in which the need for the additional spectrum has already been determined. Note that communication between the domain proxy 1014 and a CBSD (e.g., an eNB/gNB) may have already taken place, e.g., the domain proxy 1014 can tell the CBSD 1016 that based on the monitoring of the thresholds, the CBSD 1016 needs more spectrum and is to initiate the process by sending a CBSD registration request. Similarly, the CBSD 1016 can proactively inform the domain proxy 1014 that based on its own monitoring or historical pattern data, that more spectrum is desired. The CBSD registration request in FIG. 11 can thus be triggered by the CBSD 1016, or can be in response to an invitation from the domain proxy 1014 to send the CBSD registration request.

Once the domain proxy receives the CBSD registration request, the domain proxy 1014 forwards the CBSD registration request to the global multisite controller 120, providing the needed (standard-specified) information, e.g., including owner data, location data, and transmission characteristics, e.g. based on the request from the CBSD 1016 that needs the additional spectrum. Based on the request, the global multisite controller 120 updates its inventory (e.g., comprising identities of base stations and associated cells and statuses, which cells are in a particular area/region, where they are located, which are collocated, cell bandwidth, cell frequency, and the like), and sets up telemetry. The global multisite controller 120 analyzes adjacent cells and their configurations to prepare an (e.g., initial) configuration corresponding to the request.

The global multisite controller 120 (which in this example communicates directly with the spectrum access service (SAS) 112 via a SAS-CBSD interface rather than through the domain proxy 1014) forwards the CBSD registration request to the spectrum access system 112, and receives a registration response. In this example, the CBSD 1016 is thus appropriately registered. Note that the SAS evaluates requests and rejects incorrect/inappropriate requests; for purposes of brevity and explanation, in the examples herein the CBSD requests are not rejected, and at least some CBRS spectrum is available.

However the registration response is not yet returned by the spectrum access service (SAS) 112 to the domain proxy 1014. Instead, the response will be returned when a grant of CBRS spectrum is obtained by the SAS 112.

As set forth herein, to obtain a grant of CBRS spectrum, a CBSD spectrum inquiry is made by the global multisite controller 120 to the SAS 112 to determine which frequencies are available for the domain proxy 1014 (and ultimately the CBSD 1016) to use. The SAS responds with the frequencies; (note that the term "channel" can be used to describe a 10 MHz segment of the CBRS spectrum).

Once the available spectrum is returned to the global multisite controller 120, the global multisite controller 120 selects one or more of the frequencies based on the amount requested, e.g., corresponding to the incremental spectrum claim step and the initial configuration plan. The global multisite controller 120 can request more than a single increment on behalf of the CBSD with the understanding that the CBSD will increase (or decrease) according to the corresponding step size and instruct the global multisite controller 120 to release any additional CBRS spectrum that is not needed, e.g., once the increment(s) converge to a more optimal state.

A CBSD grant request is then sent by the global multisite controller 120, and in this example, the response from the SAS 112 grants the requested CBRS spectrum. The global multisite controller 120 returns a registration response along with the spectrum grant to the domain proxy 1014, which in turn returns the registration response to the CBSD 1016. Note that in the example of FIGS. 12 and 12 the CBSD 1016 is configured to expect such a combined response to a CBSD registration request, however it is feasible for a domain proxy to interact with a CBSD with individual CBSD requests/responses, without the CBSD necessarily knowing of the global multisite controller's involvement.

Once the spectrum is granted, the CBSD 1016 (via heartbeat-based authorizations) can schedule its CBRS-capable user equipment devices (of device pool 1050) to transmit and receive in the granted CBRS spectrum. The CBSD and domain proxy can exchange various push-and-pull metrics (e.g., obtained via performance monitoring) for the observation time window.

Consider that in the example of FIGS. 11 and 12 that the currently allocated CBRS spectrum (via the communications above the dashed line in FIG. 11) is to be adapted into a modified amount of spectrum (via the communications below the dashed line in FIG. 11, and in FIG. 12). A monitoring and/or threshold report, which can be for a group of CBSDs, is sent to the global multisite controller 120.

The global multisite controller 120 can perform analytics (ML, AI, Rules) on the monitoring and/or threshold report to develop a spectrum adjustment plan, and obtain verification through SAS with respect to the spectrum adjustment plan. In the example of FIG. 12, to adjust the allocated CBRS spectrum, which can be a further increase or a decrease, the global multisite controller 120 makes a new CBSD spectrum inquiry request to obtain a CBSD spectrum response, and based on the response, request a new spectrum grant. When received, the new spectrum grant is returned to the domain proxy 1014 as a CBSD update with the new spectrum grant (for individual and/or collective action enforcement to one or more cells), which in turn is returned by the domain proxy 1014 to the CBSD 1016. As is understood, further updated monitoring and/or threshold reports can be sent to the global multisite controller 120, with the operations and communications repeated to obtain further updated spectrum grants, and so on. Also, although not explicitly shown, it is understood that the CBRS spectrum grant can be relinquished by the CBSD 1016/the domain proxy 1014 via the global multisite controller 120.

Figure 13:
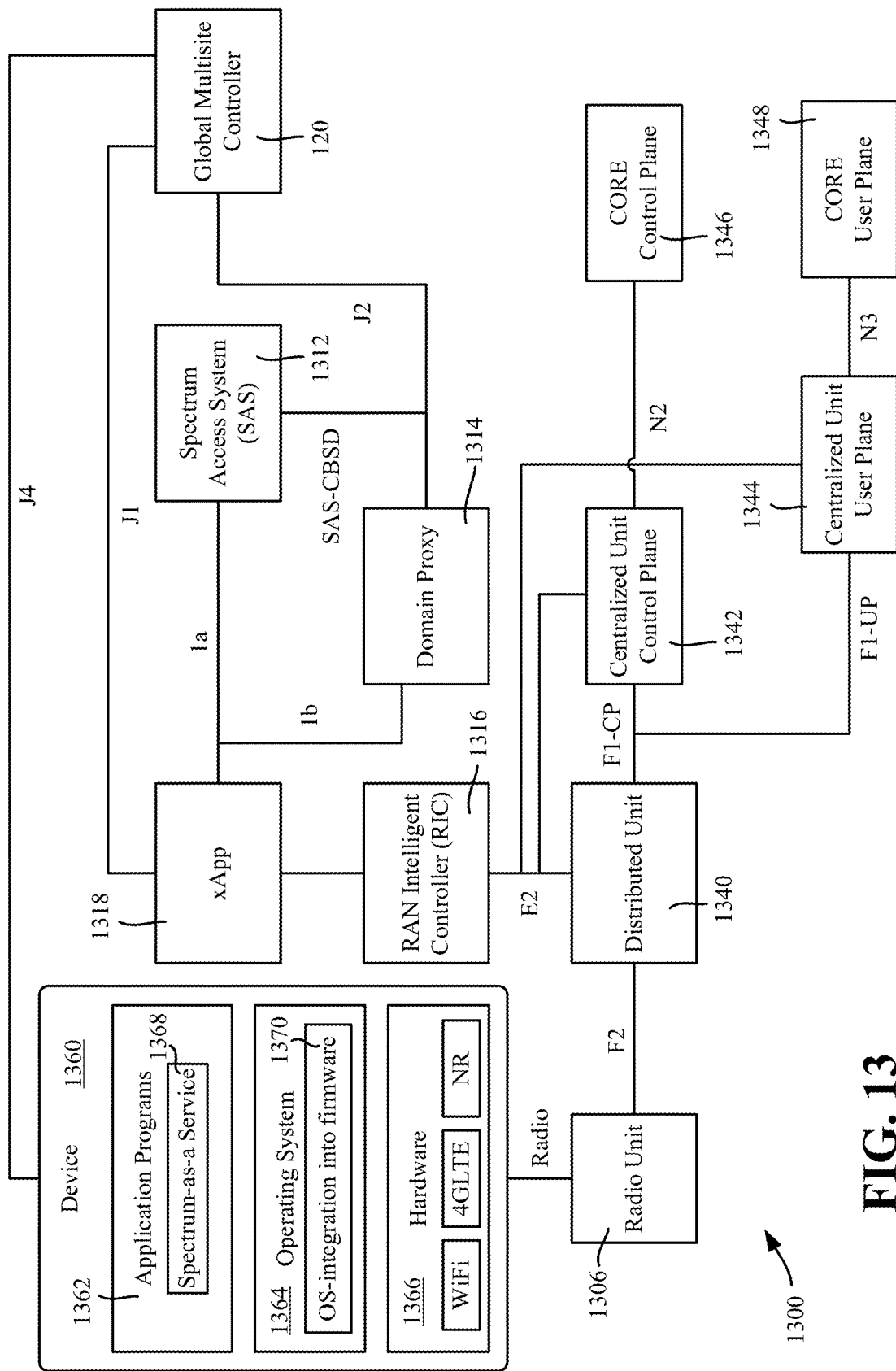
FIG. 13 is a block diagram representation of example components including a user device configured to request an adapting of spectrum to increase or decrease bandwidth based on various information, in accordance with various aspects and implementations of the subject disclosure.
Figure 14:
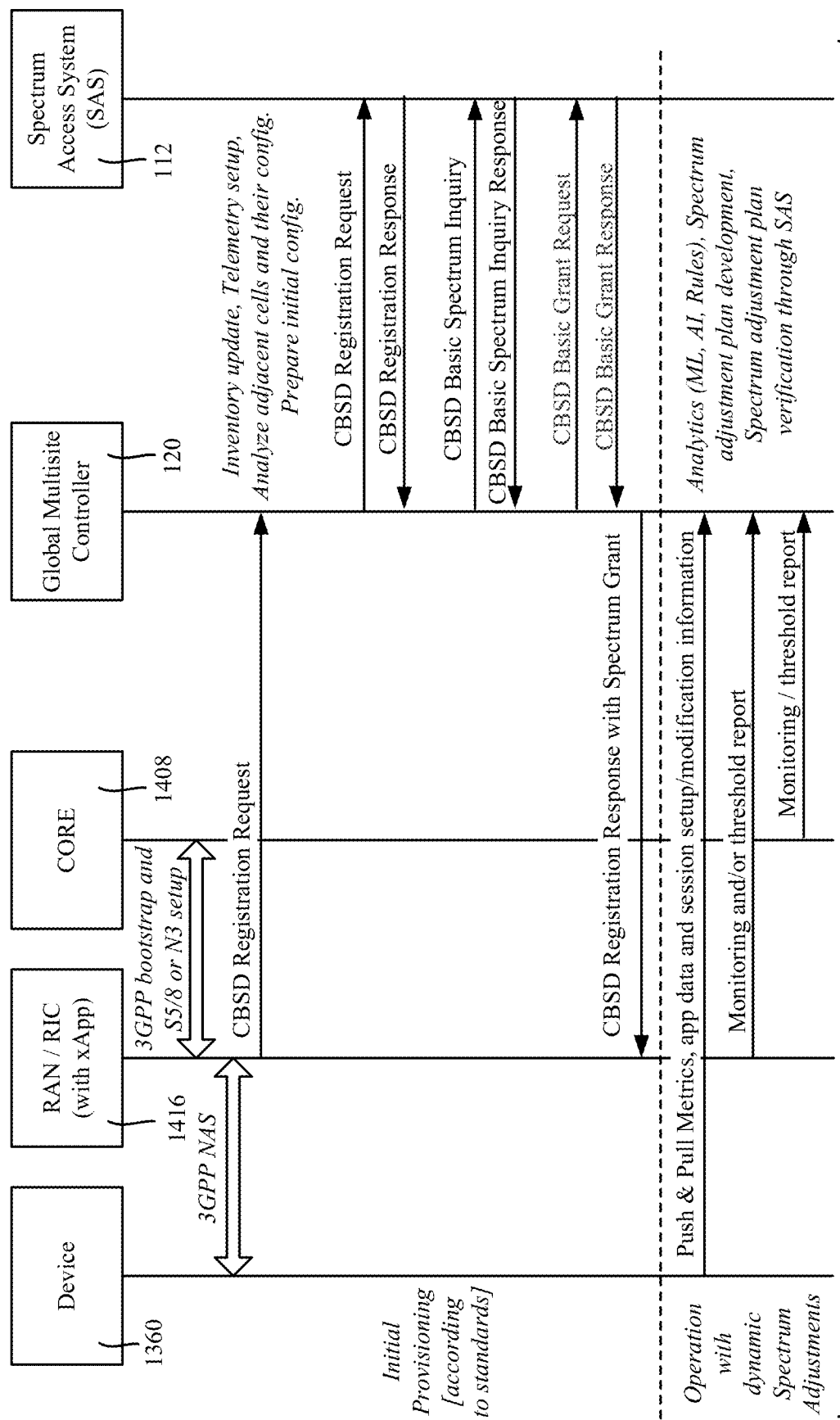
FIGS. 14 and 15 comprise a dataflow and timing representation showing example communications between components (e.g., of FIG. 13) to allocate citizens band radio service (CBRS) spectrum on demand, in accordance with various aspects and implementations of the subject disclosure.
Figure 15:
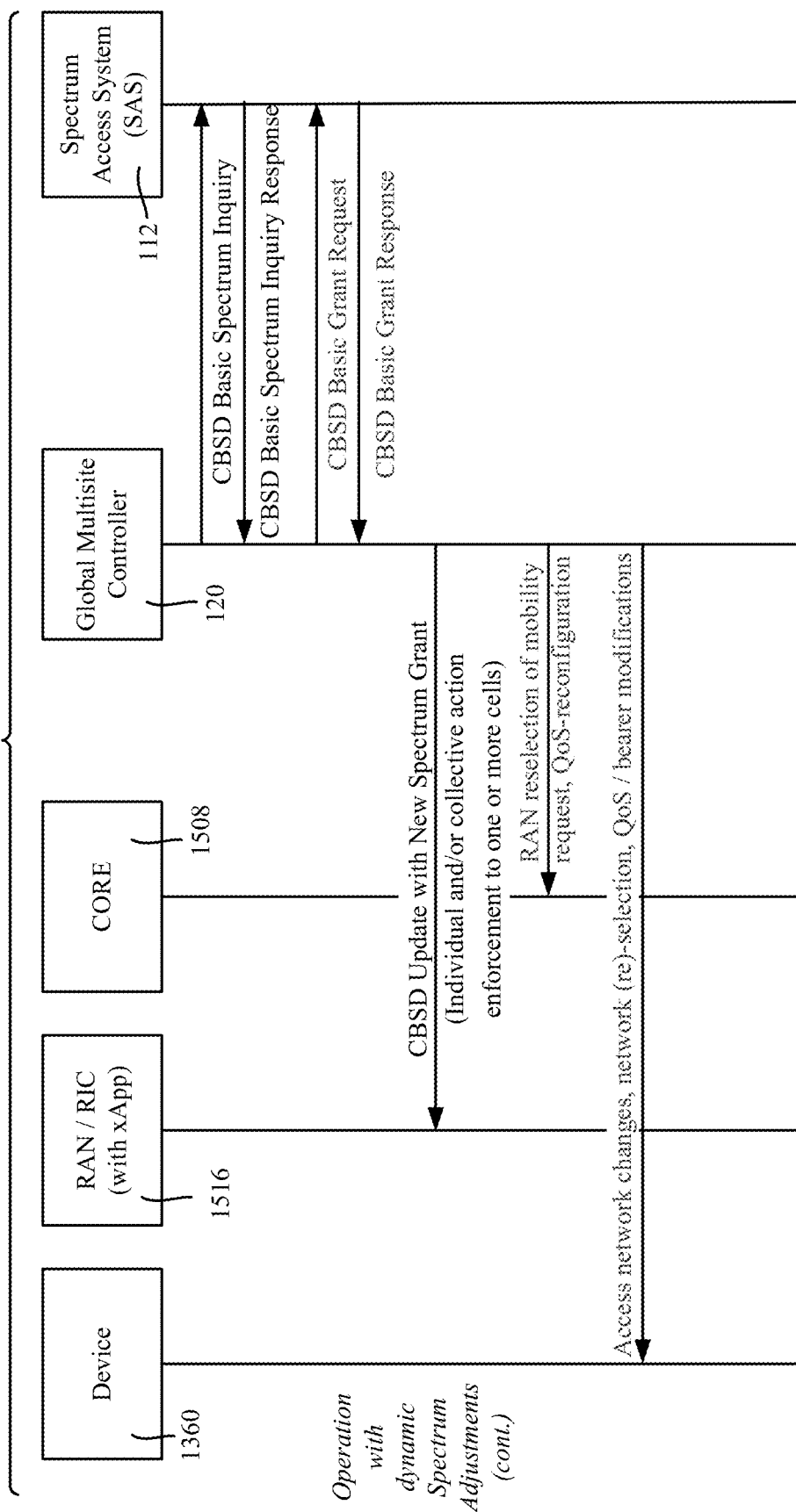

Another example implementation is shown in FIGS. 13-15 in which client-side spectrum as a service that facilitates adapting/dynamically allocating spectrum is incorporated into a device 1360. Client-side spectrum as a service can be independent, or can be in addition to network-based spectrum as a service as represented in FIGS. 1-12. Spectrum control can be a per-customer solution, or per-enterprise solution (e.g., configured on a company's laptops).

Note that while FIG. 13 shows a new radio (e.g., 5G) example with an xApp 1318/RIC 1316, other client-side spectrum as a service implementations (e.g., LTE) are feasible. In general, as the various 5G network components have been previously described with reference to FIG. 4, these components are not described again for purposes of brevity. Further, 6G is about to be standardized and is expected to be applicable to the technology described herein as well, in which the THz spectrum can be integrated into an as-a-Service offering.

As shown in FIG. 13, the device 1360, which comprises application programs 1382, an operating system 1384 and hardware 1386, is configured to implement spectrum as a service, which enables the device 1360 to signal desired bandwidth requirements into the network. In one alterative, a spectrum as a service application program 1368 detects the need for additional or reduced bandwidth, and operates to signal the desired bandwidth requirements to the network. In another alternative, an embedded controller, e.g., integrated into firmware (block 1370) or operating system extension can adapt the device 1360 to obtain the desired bandwidth. As is understood, a combination of an application program, operating system extension and/or an embedded controller can be implemented to perform the device-based bandwidth management operations.

In any event, the operating system and/or application can securely interact with the network infrastructure to request spectrum on demand as a service. Control-points on the device can be used as a secure anchor point on the device for decision making and control-plane signaling.

The spectrum request can be based on telemetry data known to the device, can be event driven (a certain application has started), can be based on a notification (e.g., of virtual reality or a high definition video) and/or heuristics and the like.

By way of example, one feasible action the device can perform is to increase bandwidth before and/or during a video call, which results in higher quality viewing experience. Other high-bandwidth usage cases may similarly benefit from receiving additional bandwidth from the network. After the video call terminates, the device acts to reduce bandwidth, which can result in a reduced bill, and less consumption of device energy state. Another such action is to configure best effort service when a user is interacting with an email program.

Performance versus battery life can be balanced, such as to only turn on adaptive spectrum operations when needed, else drain the battery (via more processing), increase operational cost and so on. The adaptive spectrum operations can be based on an iterative algorithm, such as to start with high bandwidth claim then reduce incrementally, or vice-versa. Reinforcement learning can facilitate automated actions, so as to be self-adjusting per use case.

Spectrum as a service to manage bandwidth can be triggered reactively during service invocation/termination, as in the above video-call example. Bandwidth can be increased or decreased proactively based on historical data, e.g., user patterns, behavior of other devices/user profiles for a given location, time, a mix of application programs active and/or installed on the device (which can be identified). As with other implementations, the UL:DL ratio and number of carrier aggregations used can be adjusted based on a usage scenario.

FIGS. 14 and 15 comprise a dataflow/timing diagram of communications between various components corresponding to those of FIG. 13, in an example CBRS implementation in which currently allocated spectrum is to be adapted into modified allocated spectrum via the addition of CBRS spectrum. In this example, the device 1360 works with a RAN/RIC that has an xApp (block 1516) that performs the CBSD-related operations to dynamically allocate CBRS spectrum for the device 1360 via the global multisite controller 120, including based on data provided from the device to the global multisite controller 120.

FIGS. 14 and 15 represent a state in which a need for CBRS spectrum has already been determined. The initial provisioning operations (above the dashed line in FIG. 15) are the same as described with reference to FIG. 4, and thus are not described again for purposes of brevity. In this example, via the global multisite controller 120 and SAS 112 communications, CBRS spectrum is granted to the RAN/RIC/xApp represented by block 1516.

Turning to operation with dynamic spectrum adjustments, (as shown below the dashed line in FIG. 15 and in FIG. 16), as set forth herein, the device 1360 is configured to provide data to the global multisite controller 120, which can include push and pull metrics, application-related data and/or session setup/modification information. The RAN/RIC/xApp 1516 can send a monitoring and/or threshold report to the global multisite controller 120, as can the core 1408. Based on the device data, the xApp data and/or the core data, the global multisite controller 120 can perform analytics (ML, AI, Rules) to develop a spectrum adjustment plan, and obtain verification through the SAS 112 with respect to the spectrum adjustment plan.

In the example of FIG. 15, to adjust the allocated CBRS spectrum, which can be a further increase or a decrease, the global multisite controller 120 makes a new CBSD spectrum inquiry request to obtain a CBSD spectrum response, and based on the response, requests a new spectrum grant. When received, the new spectrum grant is returned to the RAN/RIC 1416 as a CBSD update with the new spectrum grant (for individual and/or collective action enforcement to one or more cells). RAN reselection of a mobility request, and/or quality of service (QoS) reconfiguration information can be returned to the core 1408. Access network changes, network (re)-selection, QoS/bearer modifications and the like can be returned by the global multisite controller 120 to the device 1360.

As is understood, the data sent (below the dashed line in FIG. 14) to the global multisite controller 120 can be re-sent, with similar responses returned, and so on. Also, although not explicitly shown, it is understood that the CBRS spectrum grant can be relinquished by the RAN/RIC/xApp 1416 via the global multisite controller 120.

Figure 16A:
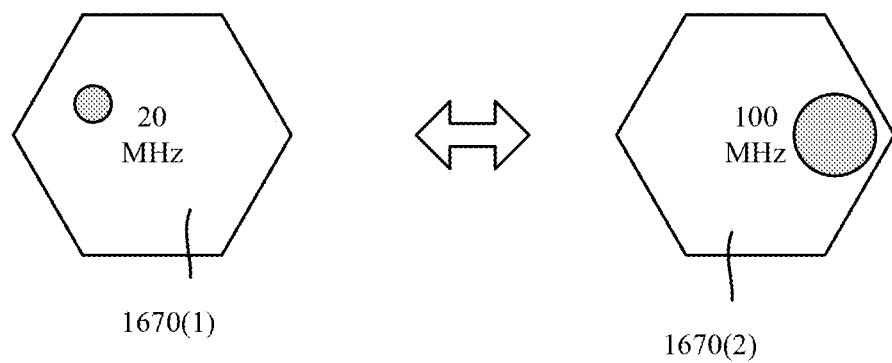
FIG. 16A depicts an example cell of a wireless communications network in which additional spectrum is added to the cell and a hotspot is relocated within the cell, in accordance with various aspects and implementations of the subject disclosure.
Figure 16B:
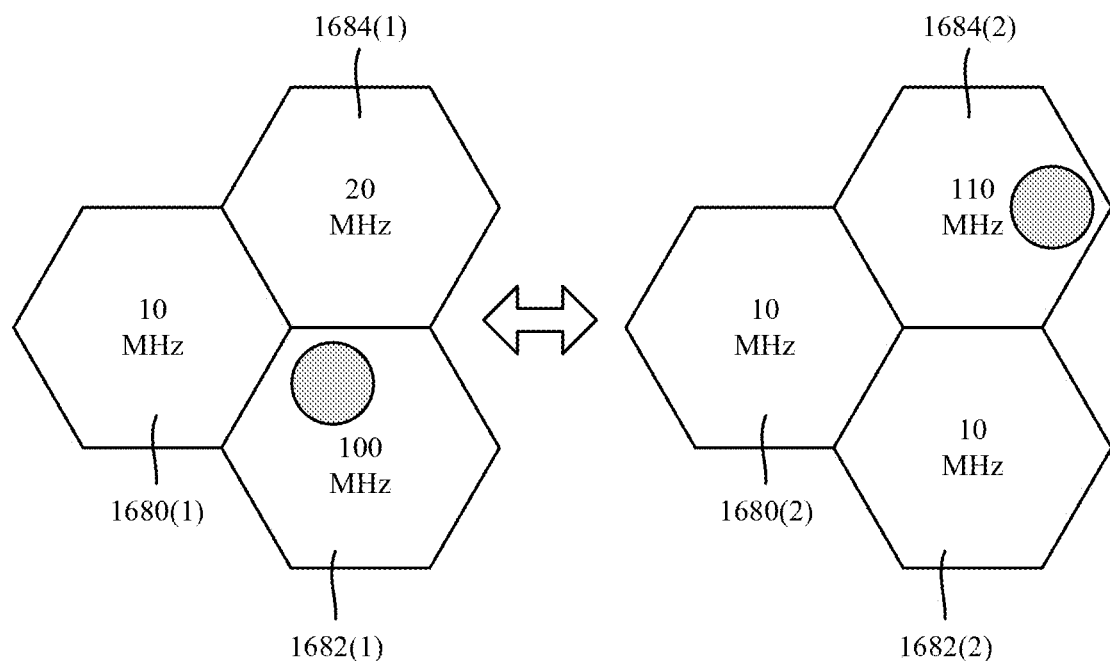
FIG. 16B depicts example group of cell of a wireless communications network in which spectrum is modified in two of the cells and a hotspot is relocated from one cell to another cell, in accordance with various aspects and implementations of the subject disclosure.

FIGS. 16A and 16B show additional examples of dynamic spectrum allocation to adapt to current state data and/or to proactively control the amount of allocated spectrum, as well as hotspot location. FIG. 16A is directed to a single cell scenario with hotspot relocation within that single cell, while FIG. 16B is directed to a multiple cell scenario with hotspot movement across cell boundaries.

Consider that in FIG. 16A a cell in a first state, labeled 1670(1), has 20 MHz of spectrum (or additional, e.g., CBRS spectrum) allocated thereto. The cell (in the first state) 1670(1) has a relocatable hotspot as represented by the shaded circle therein; note that the term "hotspot" is not intended to be limited to any particular frequency, e.g., the hotspot can be, but is not necessarily a Wi-Fi hotspot, and indeed can be based on CBRS spectrum. As set forth herein, relocation of a hotspot can be done in various ways, e.g., the hotspot can be mobile, a hotspot can be activated in a (mostly) stationary or fixed device location and deactivated in view of a different activated device in a different location, and so on. As shown in FIG. 16A, the cell in a second state 1670(2) has increased its spectrum (shown as 100 MHz) as described herein, and further, has relocated and increased the size of its hotspot.

In FIG. 16B three cells are in a first state as represented by cells labeled 1680(1), 1682(1) and 1684(1), having allocated spectrum of 10 MHz, 100 MHz and 20 MHz, respectively. In a second state following dynamic spectrum allocation, the three cells labeled 1680(2), 1682(2) and 1684(3) have reallocated spectrum of 10 MHz (unchanged), 10 MHz (reduced) and 110 MHz (increased), respectively. Further, the hotspot has relocated from the cell labeled 1682(1) to the cell labeled 1684(2).

Figure 17:
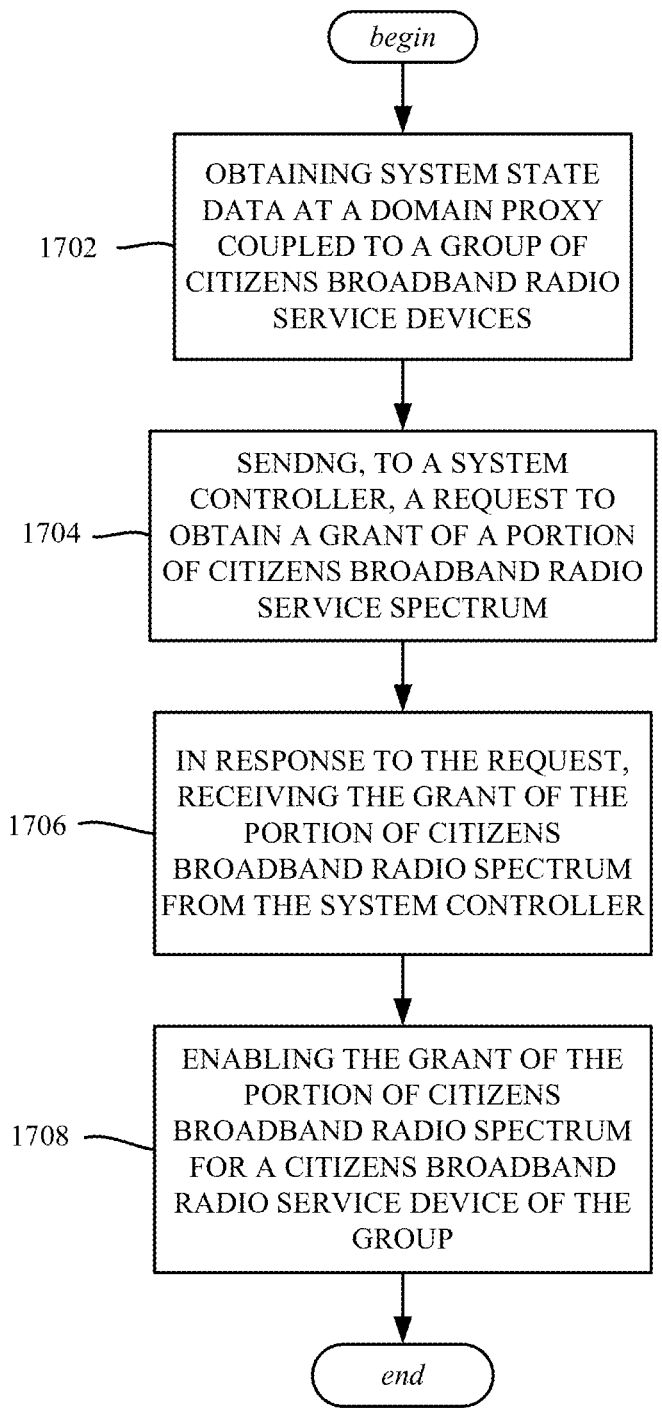
FIG. 17 is a flow diagram representing example operations related to a domain proxy requesting and receiving a grant of a portion of citizens broadband radio spectrum (CBRS) for enabling a citizens broadband radio service device (CBSD) to use the granted portion, in accordance with various aspects and embodiments of the subject disclosure.

One or more aspects can be embodied in a system, such as represented in FIG. 17, and for example can comprise a memory that stores computer executable components and/or operations, and a processor that executes computer executable components and/or operations stored in the memory. Example operations can comprise operation 1702, which represents obtaining system state data at a domain proxy coupled to a group of citizens broadband radio service devices. Operation 1704 represents sending, to a system controller, a request to obtain a grant of a portion of citizens broadband radio service spectrum. Operation 1706 represents, in response to the request, receiving the grant of the portion of citizens broadband radio spectrum from the system controller. Operation 1708 represents enabling the grant of the portion of citizens broadband radio spectrum for a citizens broadband radio service device of the group.

Obtaining the system state data can comprise collecting telemetry data at the domain proxy.

Obtaining the system state data can comprise receiving metadata from the system controller, and collecting the system state data based on the metadata.

Obtaining the system state data can comprise monitoring for performance data at the domain proxy of the system.

The citizens broadband radio service device can operate as a base station, and obtaining the system state data can comprise obtaining at least part of the state data from the base station.

Obtaining the system state data can comprise obtaining at least part of the state data from a core network device.

Further operations can comprise monitoring for performance data following the enabling of the grant of the portion of citizens broadband radio spectrum. Further operations can comprise sending, to the system controller, a monitoring report based on the performance data.

Further operations can comprise sending, to the citizens broadband radio service device of the group, data representing a downlink-to-uplink ratio based on the system state data.

Further operations can comprise sending, to the citizens broadband radio service device of the group, data representing a number of carrier aggregations.

Figure 18:
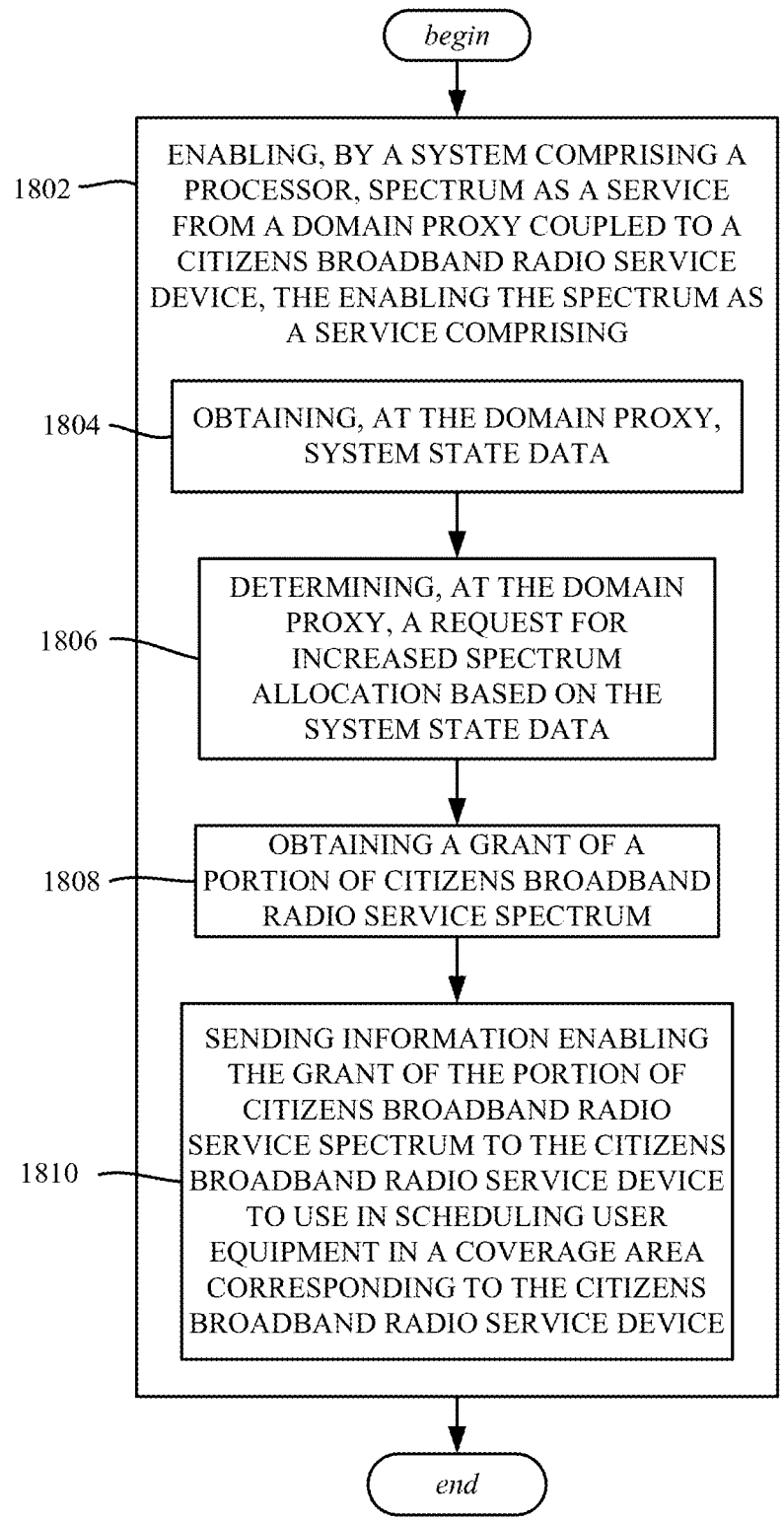
FIG. 18 is a flow diagram representing example operations related to enabling spectrum as a service from a domain proxy coupled to a CBSD, in accordance with various aspects and embodiments of the subject disclosure.

One or more aspects can be embodied in a method, such as represented in FIG. 18. Example operations can comprise operation 1802, which represents enabling, by a system comprising a processor, spectrum as a service from a domain proxy coupled to a citizens broadband radio service device. Enabling the spectrum as a service can comprise obtaining, at the domain proxy, system state data (operation 1804), determining, at the domain proxy, a request for increased spectrum allocation based on the system state data (operation 1806), obtaining a grant of a portion of citizens broadband radio service spectrum (operation 1808) and sending information enabling the grant of the portion of citizens broadband radio service spectrum to the citizens broadband radio service device to use in scheduling user equipment in a coverage area corresponding to the citizens broadband radio service device (operation 1810).

Aspects can comprise monitoring, by the system, system performance following the sending of the information enabling the grant of the portion of citizens broadband radio service spectrum to the citizens broadband radio service device.

Aspects can comprise, relinquishing, by the system, the grant of the portion of the spectrum.

Obtaining the grant of the portion of citizens broadband radio service spectrum can comprise communicating a registration request to a system controller coupled to a spectrum access service.

Aspects can comprise communicating, by the system, with the citizens broadband radio service device to change a downlink-to-uplink ratio based on the state data.

The system state data can comprise historical data, and obtaining the portion of citizens broadband radio service spectrum can comprise proactively obtaining the portion of citizens broadband radio service spectrum based on the historical data in anticipation of a request for additional spectrum by the citizens broadband radio service device.

The citizens broadband radio service device can be a first citizens broadband radio service device, the portion of the spectrum can correspond to a hotspot, and further operation can comprise facilitating, by the system, the grant of the portion of the spectrum being moved from the first citizens broadband radio service device to a second citizens broadband radio service device.

Figure 19:
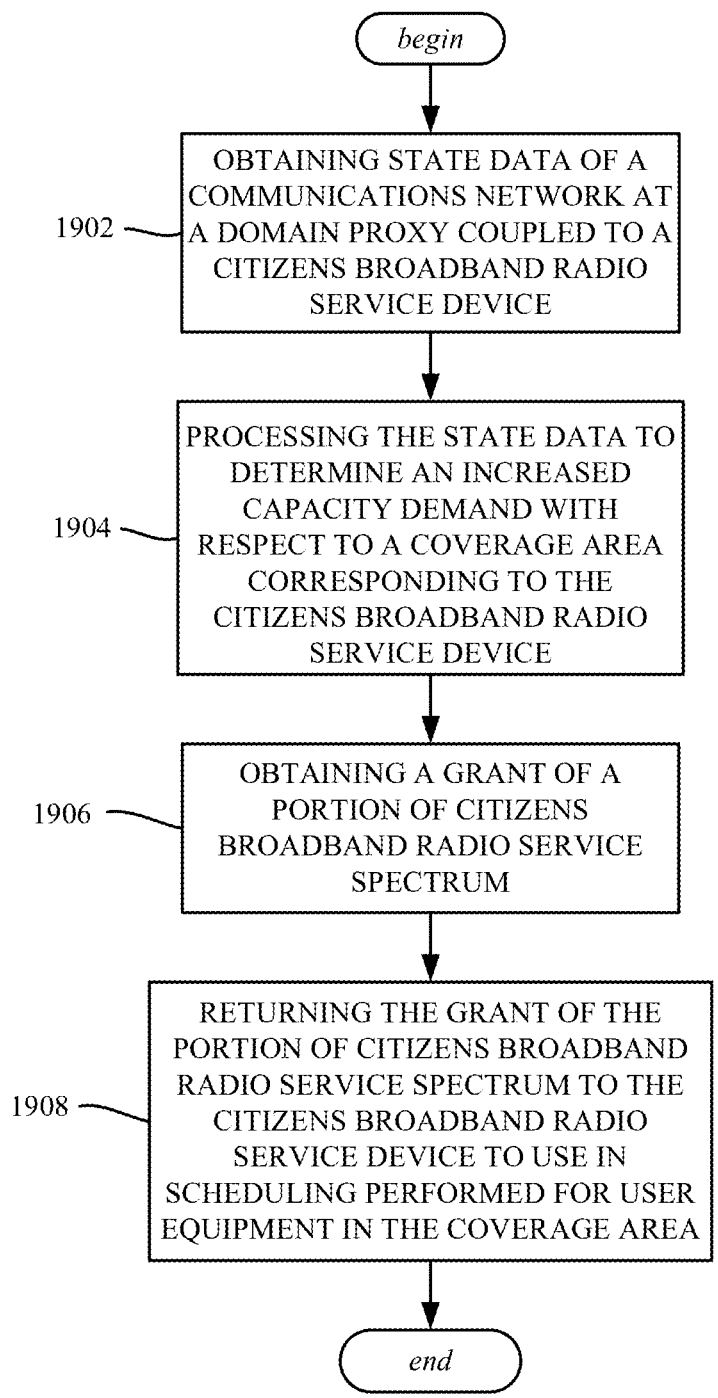
FIG. 19 is a flow diagram representing example operations related to processing network state data to increase capacity in a coverage area corresponding to a CBSD coupled to a domain proxy, in accordance with various aspects and embodiments of the subject disclosure.

FIG. 19 summarizes various example operations, e.g., corresponding to a machine-readable storage medium, comprising executable instructions that, when executed by a processor, facilitate performance of operations. Operation 1902 represents obtaining state data of a communications network at a domain proxy coupled to a citizens broadband radio service device. Operation 1904 represents processing the state data to determine an increased capacity demand with respect to a coverage area corresponding to the citizens broadband radio service device. Operation 1906 represents obtaining a grant of a portion of citizens broadband radio service spectrum. Operation 1908 represents returning the grant of the portion of citizens broadband radio service spectrum to the citizens broadband radio service device to use in scheduling performed for user equipment in the coverage area.

Further operations can comprise changing a downlink-to-uplink ratio based on the state data.

Further operations can comprise communicating with a spectrum access system via a global multisite controller to obtain the grant of the portion of the citizens broadband radio service spectrum.

As can be seen, the technology described herein increases spectral efficiency in wireless networks, including private wireless networks, and operates as a strategic control point for private wireless deployment of any scale including small, medium or large deployments. The technology described herein is applicable to licensed, unlicensed and shared types of spectrum. The technology described herein can be implemented as a spectrum as a service (aaS) model, which can be used for "pay-as-you-go" spectrum allocation. The technology described herein improves a customer experience and quality of service, for example when compared to best effort deployments.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying wireless capacity of wireless systems. The use of multiple-input multiple-output (MIMO) techniques can improve mmWave communications; MIMO can be used for achieving diversity gain, spatial multiplexing gain and beamforming gain. Carrier-aggregation techniques are considered as well to license assisted access as a means to combine multiple radio types such as cellular and WiFi.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 20:
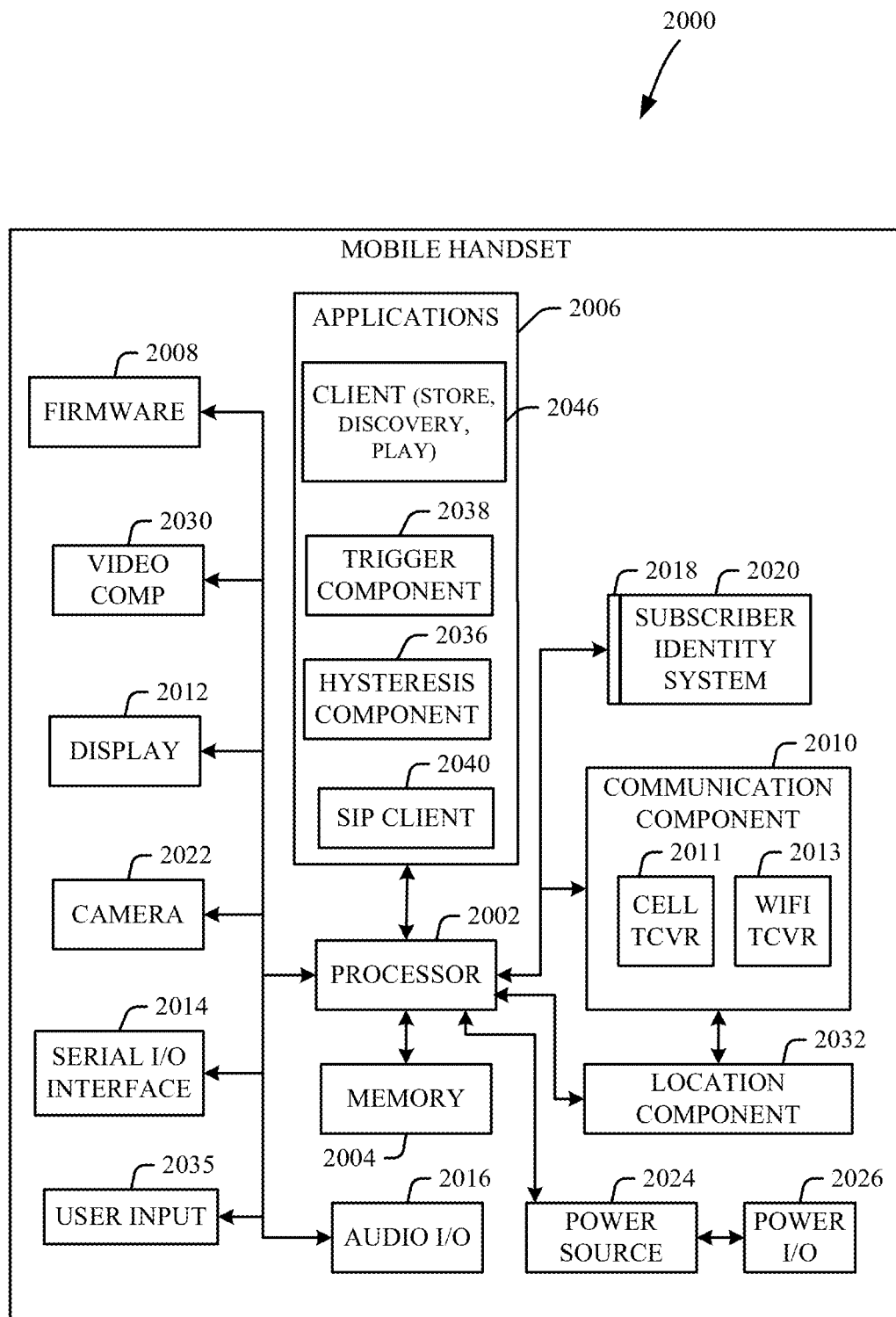
FIG. 20 illustrates an example block diagram of an example mobile handset operable to engage in a system architecture that facilitates wireless communications according to one or more embodiments described herein.

Referring now to FIG. 20, illustrated is a schematic block diagram of an example end-user device (such as user equipment) that can be a mobile device 2000 capable of connecting to a network in accordance with some embodiments described herein. Although a mobile handset 2000 is illustrated herein, it will be understood that other devices can be a mobile device, and that the mobile handset 2000 is merely illustrated to provide context for the embodiments of the various embodiments described herein. The following discussion is intended to provide a brief, general description of an example of a suitable environment 2000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2000 includes a processor 2002 for controlling and processing all onboard operations and functions. A memory 2004 interfaces to the processor 2002 for storage of data and one or more applications 2006 (e.g., a video player software, user feedback component software, etc.). Other applications can include voice recognition of predetermined voice commands that facilitate initiation of the user feedback signals. The applications 2006 can be stored in the memory 2004 and/or in a firmware 2008, and executed by the processor 2002 from either or both the memory 2004 or/and the firmware 2008. The firmware 2008 can also store startup code for execution in initializing the handset 2000. A communications component 2010 interfaces to the processor 2002 to facilitate wired/wireless communication with external systems, e.g., cellular networks, VoIP networks, and so on. Here, the communications component 2010 can also include a suitable cellular transceiver 2011 (e.g., a GSM transceiver) and/or an unlicensed transceiver 2013 (e.g., Wi-Fi, WiMax) for corresponding signal communications. The handset 2000 can be a device such as a cellular telephone, a PDA with mobile communications capabilities, and messaging-centric devices. The communications component 2010 also facilitates communications reception from terrestrial radio networks (e.g., broadcast), digital satellite radio networks, and Internet-based radio services networks.

The handset 2000 includes a display 2012 for displaying text, images, video, telephony functions (e.g., a Caller ID function), setup functions, and for user input. For example, the display 2012 can also be referred to as a "screen" that can accommodate the presentation of multimedia content (e.g., music metadata, messages, wallpaper, graphics, etc.). The display 2012 can also display videos and can facilitate the generation, editing and sharing of video quotes. A serial I/O interface 2014 is provided in communication with the processor 2002 to facilitate wired and/or wireless serial communications (e.g., USB, and/or IEEE 2094) through a hard-wire connection, and other serial input devices (e.g., a keyboard, keypad, and mouse). This supports updating and troubleshooting the handset 2000, for example. Audio capabilities are provided with an audio I/O component 2016, which can include a speaker for the output of audio signals related to, for example, indication that the user pressed the proper key or key combination to initiate the user feedback signal. The audio I/O component 2016 also facilitates the input of audio signals through a microphone to record data and/or telephony voice data, and for inputting voice signals for telephone conversations.

The handset 2000 can include a slot interface 2018 for accommodating a SIC (Subscriber Identity Component) in the form factor of a card Subscriber Identity Module (SIM) or universal SIM 2020, and interfacing the SIM card 2020 with the processor 2002. However, it is to be appreciated that the SIM card 2020 can be manufactured into the handset 2000, and updated by downloading data and software.

The handset 2000 can process IP data traffic through the communication component 2010 to accommodate IP traffic from an IP network such as, for example, the Internet, a corporate intranet, a home network, a person area network, a gateway or other forms of aggregation points, etc., through an ISP or broadband cable provider. Thus, VoIP traffic can be utilized by the handset 800 and IP-based multimedia content can be received in either an encoded or decoded format.

A video processing component 2022 (e.g., a camera) can be provided for decoding encoded multimedia content. The video processing component 2022 can aid in facilitating the generation, editing and sharing of video quotes. The handset 2000 also includes a power source 2024 in the form of batteries and/or an AC power subsystem, which power source 2024 can interface to an external power system or charging equipment (not shown) by a power I/O component 2026.

The handset 2000 can also include a video component 2030 for processing video content received and, for recording and transmitting video content. For example, the video component 2030 can facilitate the generation, editing and sharing of video quotes. A location tracking component 2032 facilitates geographically locating the handset 2000. As described hereinabove, this can occur when the user initiates the feedback signal automatically or manually. A user input component 2034 facilitates the user initiating the quality feedback signal. The user input component 2034 can also facilitate the generation, editing and sharing of video quotes. The user input component 2034 can include such conventional input device technologies such as a keypad, keyboard, mouse, stylus pen, and/or touch screen, for example.

Referring again to the applications 2006, a hysteresis component 2036 facilitates the analysis and processing of hysteresis data, which is utilized to determine when to associate with the access point. A software trigger component 2038 can be provided that facilitates triggering of the hysteresis component 2038 when the Wi-Fi transceiver 2013 detects the beacon of the access point. A SIP client 2040 enables the handset 2000 to support SIP protocols and register the subscriber with the SIP registrar server. The applications 2006 can also include a client 2042 that provides at least the capability of discovery, play and store of multimedia content, for example, music.

The handset 2000, as indicated above related to the communications component 810, includes an indoor network radio transceiver 2013 (e.g., Wi-Fi transceiver). This function supports the indoor radio link, such as IEEE 802.11, for the dual-mode GSM handset 2000. The handset 2000 can accommodate at least satellite radio services through a handset that can combine wireless voice and digital radio chipsets into a single handheld device.

Figure 21:
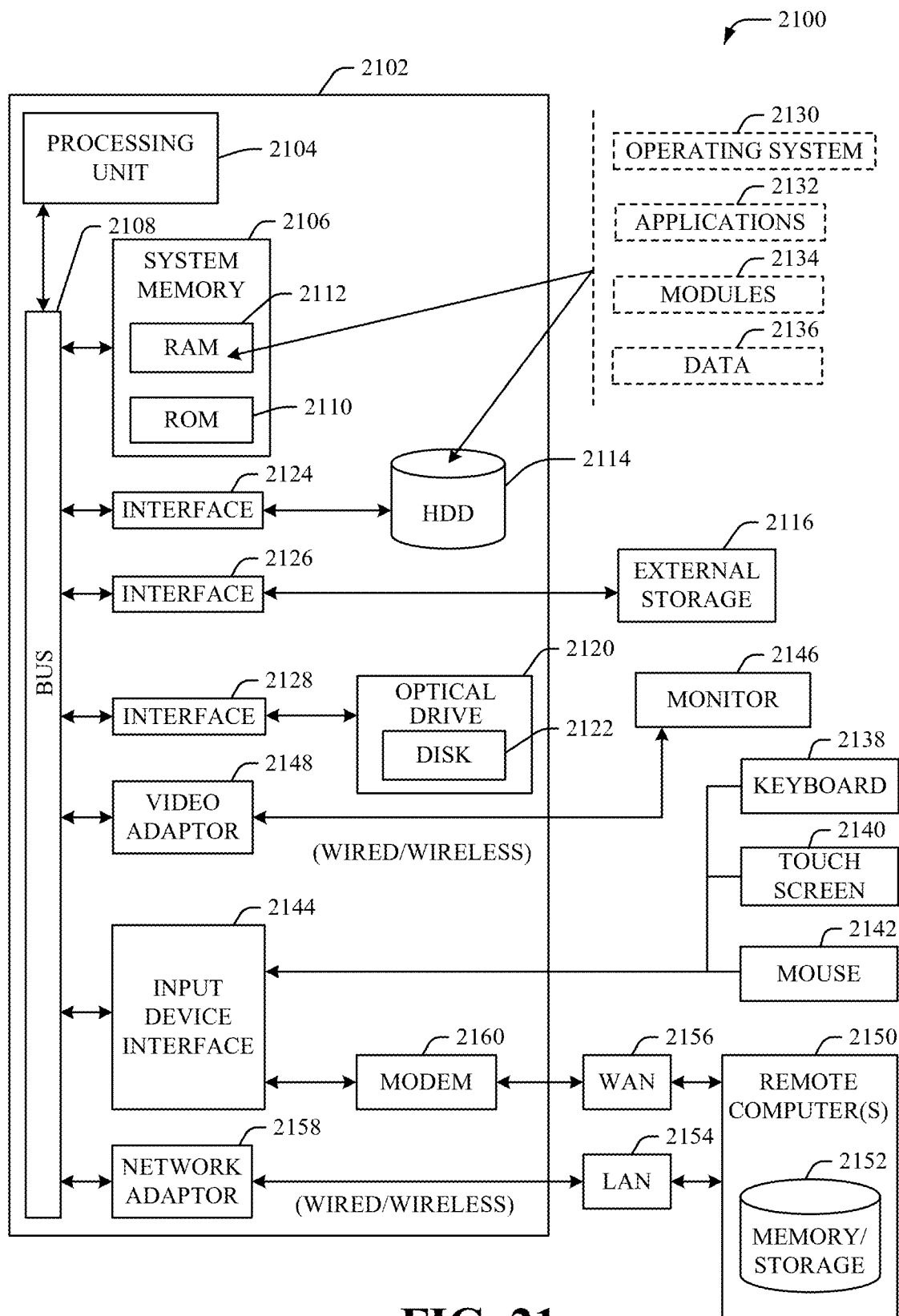
FIG. 21 illustrates an example block diagram of an example computer/machine system operable to engage in a system architecture that facilitates wireless communications according to one or more embodiments described herein.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and an optical disk drive 2120 (e.g., which can read or write from a CD-ROM disc, a DVD, a BD, etc.). While the internal HDD 2114 is illustrated as located within the computer 2102, the internal HDD 2114 can also be configured for external use in a suitable chassis (not shown). Additionally, while not shown in environment 2100, a solid state drive (SSD), non-volatile memory and other storage technology could be used in addition to, or in place of, an HDD 2114, and can be internal or external. The HDD 2114, external storage device(s) 2116 and optical disk drive 2120 can be connected to the system bus 2108 by an HDD interface 2124, an external storage interface 2126 and an optical drive interface 2128, respectively. The interface 2124 for external drive implementations can include at least one or both of Universal Serial Bus (USB) and Institute of Electrical and Electronics Engineers (IEEE) 2094 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally include emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can include one virtual machine (VM) of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enabled with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 2094 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired and/or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network (LAN) 2154 and/or larger networks, e.g., a wide area network (WAN) 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired and/or wireless communication network interface or adapter 2158. The adapter 2158 can facilitate wired or wireless communication to the LAN 2154, which can also include a wireless access point (AP) disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/storage device 2152. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 and/or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 21 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a wireless capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
 a processor; and
 a memory that stores executable instructions that, when executed by the processor, facilitate performance of operations, the operations comprising:

obtaining system state data and historical mobility pattern data of user devices within a coverage area at a domain proxy coupled to a group of citizens broadband radio service devices operating in the coverage area;

determining, using a machine learning model, a predicted amount of spectrum demand at a predicted future time period based on the system state data and the historical mobility pattern data;

sending, to a system controller, a request to obtain a grant of a portion of citizens broadband radio service spectrum based on the predicted amount of spectrum demand at the predicted future time period;

in response to the request, receiving the grant of the portion of citizens broadband radio spectrum from the system controller; and enabling the grant of the portion of citizens broadband radio spectrum for a citizens broadband radio service device of the group.

2. The system of claim 1, wherein the obtaining the system state data comprises collecting telemetry data at the domain proxy.

3. The system of claim 1, wherein the obtaining the system state data comprises receiving metadata from the system controller, and collecting the system state data based on the metadata.

4. The system of claim 1, wherein the obtaining the system state data comprises monitoring for performance data at the domain proxy of the system.

5. The system of claim 1, wherein the citizens broadband radio service device operates as a base station, and wherein the obtaining the system state data comprises obtaining at least part of the state data from the base station.

6. The system of claim 1, herein the obtaining the system state data comprises obtaining at least part of the state data from a core network device.

7. The system of claim 1, wherein the operations further comprise monitoring for performance data following the enabling of the grant of the portion of citizens broadband radio spectrum.

8. The system of claim 7, wherein the operations further comprise sending, to the system controller, a monitoring report based on the performance data.

9. The system of claim 1, wherein the operations further comprise sending, to the citizens broadband radio service device of the group, data representing a downlink-to-uplink ratio based on the system state data.

10. The system of claim 1, wherein the operations further comprise sending, to the citizens broadband radio service device of the group, data representing a number of carrier aggregations.

11. A method, comprising:

enabling, by a system comprising a processor, spectrum as a service from a domain proxy coupled to a citizens broadband radio service device, the enabling the spectrum as a service comprising:

obtaining, at the domain proxy, system state data and historical mobility pattern data of user equipment within a coverage area;

determining, using an artificial intelligence model, a predicted amount of spectrum demand at a predicted future time period based on the system state data and the historical mobility pattern data;

determining, at the domain proxy, a request for increased spectrum allocation based on the system state data based on the predicted amount of spectrum demand at the predicted future time period;

obtaining a grant of a portion of citizens broadband radio service spectrum; and sending information enabling the grant of the portion of citizens broadband radio service spectrum to the citizens broadband radio service device to use in scheduling user equipment scheduling in the coverage area.

12. The method of claim 11, further comprising, monitoring, by the system, system performance following the sending of the information enabling the grant of the portion of citizens broadband radio service spectrum to the citizens broadband radio service device.

13. The method of claim 12, further comprising, relinquishing, by the system, the grant of the portion of the spectrum.

14. The method of claim 11, wherein the obtaining the grant of the portion of citizens broadband radio service spectrum comprises communicating a registration request to a system controller coupled to a spectrum access service.

15. The method of claim 11, further comprising, communicating, by the system, with the citizens broadband radio service device to change a downlink-to-uplink ratio based on the state data.

16. The method of claim 11, wherein the citizens broadband radio service device is a first citizens broadband radio service device, wherein the portion of the spectrum corresponds to a hotspot, and wherein the method further comprises facilitating, by the system, the grant of the portion of the spectrum being moved from the first citizens broadband radio service device to a second citizens broadband radio service device.

17. A non-transitory machine-readable medium, comprising executable instructions that, when executed by a processor, facilitate performance of operations, the operations comprising:

obtaining state data of a communications network and historical mobility pattern data of user devices within a coverage area at a domain proxy coupled to a citizens broadband radio service device;

determining, using a machine learning model, a predicted amount of spectrum demand at a predicted future time period based on the state data and the historical mobility pattern data;

obtaining a grant of a portion of citizens broadband radio service spectrum based on the predicted amount of spectrum demand at the predicted future time period; and returning the grant of the portion of citizens broadband radio service spectrum to the citizens broadband radio service device to use for user equipment scheduling in the coverage area.

18. The non-transitory machine-readable medium of claim 17 wherein the operations further comprise changing a downlink-to-uplink ratio based on the state data.

19. The non-transitory machine-readable medium of claim 17, wherein the operations further comprise communicating with a spectrum access system via a global multisite controller to obtain the grant of the portion of the citizens broadband radio service spectrum.

20. The non-transitory machine-readable medium of claim 17, wherein the obtaining the state data comprises collecting telemetry data at the domain proxy.

* * * * *